United States Patent
Sato et al.

(10) Patent No.: US 9,210,554 B2
(45) Date of Patent: Dec. 8, 2015

(54) WIRELESS COMMUNICATION APPARATUS, COMMUNICATION SYSTEM AND CONTROL METHOD OF WIRELESS COMMUNICATION APPARATUS

(75) Inventors: Masanori Sato, Tokyo (JP); Katsutoshi Itoh, Tokyo (JP); Masahiko Naito, Tokyo (JP)

(73) Assignee: SONY CORPORATION, Tokyo (JP)

( * ) Notice: Subject to any disclaimer, the term of this patent is extended or adjusted under 35 U.S.C. 154(b) by 149 days.

(21) Appl. No.: 14/002,427

(22) PCT Filed: Feb. 7, 2012

(86) PCT No.: PCT/JP2012/052743
§ 371 (c)(1),
(2), (4) Date: Oct. 9, 2013

(87) PCT Pub. No.: WO2012/120950
PCT Pub. Date: Sep. 13, 2012

(65) Prior Publication Data
US 2014/0038658 A1  Feb. 6, 2014

(30) Foreign Application Priority Data
Mar. 7, 2011  (JP) ................................. 2011-048460

(51) Int. Cl.
*H04W 4/08* (2009.01)
*H04W 8/18* (2009.01)
(Continued)

(52) U.S. Cl.
CPC ............... *H04W 4/08* (2013.01); *H04L 63/104* (2013.01); *H04W 8/186* (2013.01); *H04W 12/04* (2013.01); *H04M 3/38* (2013.01)

(58) Field of Classification Search
CPC ..... H04W 12/08; H04W 12/06; H04W 4/005; H04W 4/08; H04W 8/22; H04W 88/02; H04W 48/02; H04W 60/00; H04W 76/027; H04W 8/24; H04W 48/18; H04W 76/002; H04W 12/10; H04L 63/104; H04L 63/083; H04L 63/105; H04M 2203/2044
USPC ........ 455/435.2, 435.1, 550.1, 519, 411, 450, 455/558
See application file for complete search history.

(56) References Cited

U.S. PATENT DOCUMENTS

2006/0140196 A1* 6/2006 Tanaka et al. ................. 370/401
2008/0086738 A1* 4/2008 Nieminen ...................... 719/328
(Continued)

FOREIGN PATENT DOCUMENTS

JP  2007-019818  1/2007
JP  2010-028322  2/2010
(Continued)

OTHER PUBLICATIONS

[No Author Listed], 3GPP TR 33.812 v9.2.0 (Jun. 2010) Technical Report. $3^{rd}$ Generation Partnership Project; Technical Specification Group Services and System Aspects; Feasibility study on the security aspects of remote provisioning and change of subscription for Machine to Machine (M2M) equipment (Release 9). Jun. 2010. 87 pages.

*Primary Examiner* — Sujatha Sharma
(74) *Attorney, Agent, or Firm* — Hazuki International, LLC

(57) ABSTRACT

Provided is a wireless communication apparatus including a reception unit that receives group information to identify a group as an operation input for additional registration with the group including a plurality of wireless communication apparatuses sharing a network connection right to connect to a predetermined network via a wireless line, and a control unit that, when the group information is received, transmits an addition request that requests the additional registration with the group to a management system that manages the group via a wireless line on condition that an approval operation has been performed by one of the wireless communication apparatuses included in the group.

12 Claims, 26 Drawing Sheets

(51) Int. Cl.
*H04W 12/04* (2009.01)
*H04L 29/06* (2006.01)
*H04M 3/38* (2006.01)

(56) References Cited

U.S. PATENT DOCUMENTS

2013/0084905 A1* 4/2013 Ehara ............................ 455/500
2014/0031074 A1* 1/2014 Sato et al. ...................... 455/519
2014/0045466 A1* 2/2014 Naito et al. ................... 455/411
2014/0094182 A1* 4/2014 Sato ............................... 455/450
2014/0120878 A1* 5/2014 Sato ............................... 455/411
2014/0171077 A1* 6/2014 Itoh et al. ................... 455/435.1
2014/0194119 A1* 7/2014 Sato ........................... 455/435.2

FOREIGN PATENT DOCUMENTS

| JP | 2010-532107 | 9/2010 |
| JP | 2010-244554 | 10/2010 |
| WO | WO 2009/092115 A2 | 7/2009 |

* cited by examiner

FIG. 1
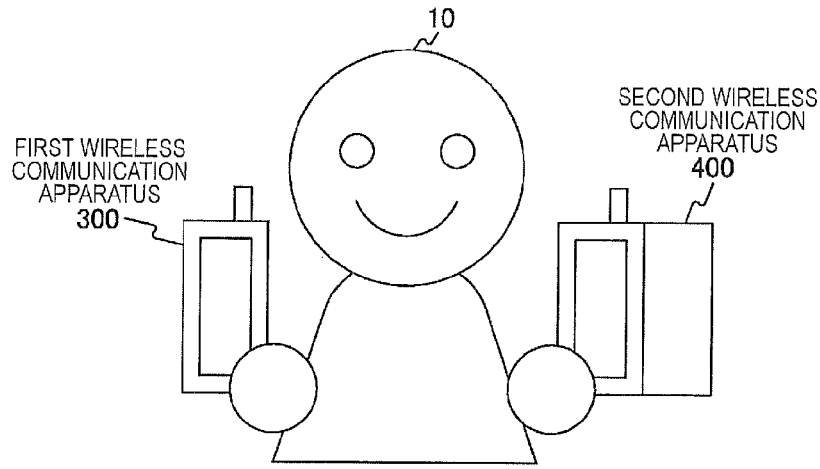
(a)
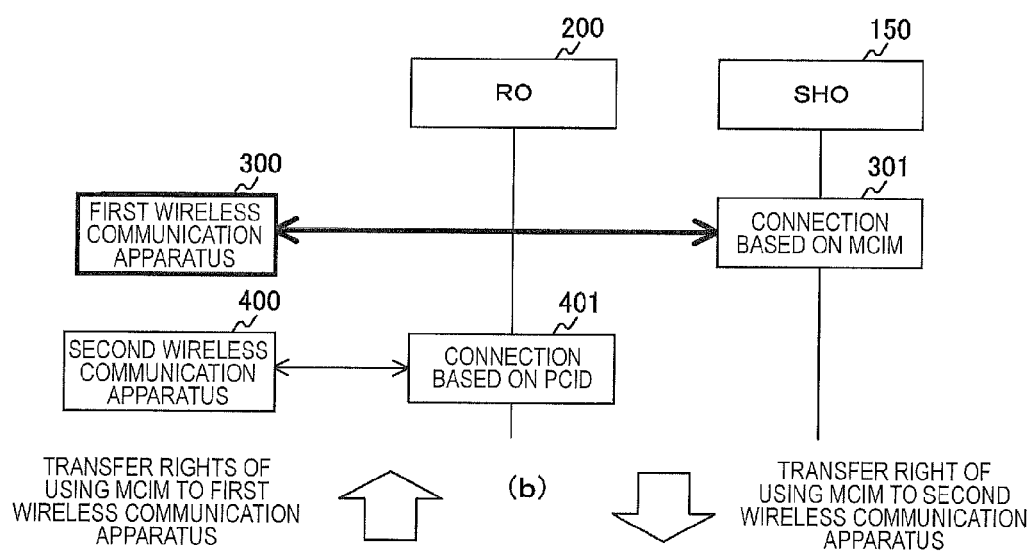
(b)
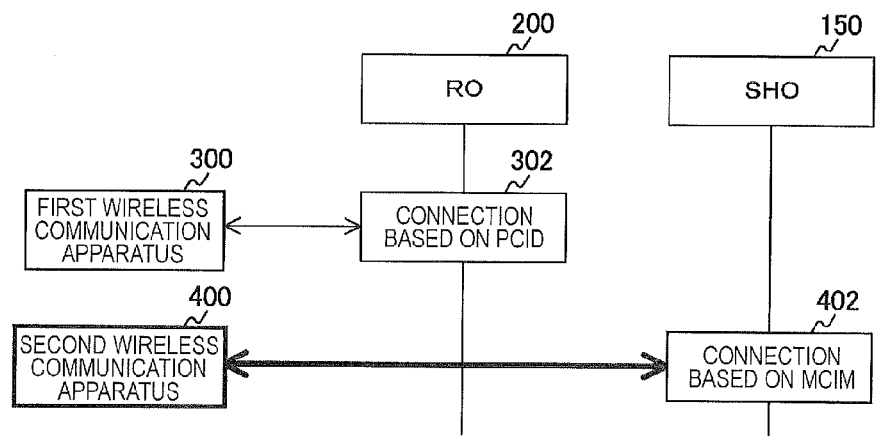
(c)

FIG. 2

THIRD WIRELESS COMMUNICATION APPARATUS 410

ADD THIRD WIRELESS COMMUNICATION APPARATUS TO "GROUP AB"

161
GROUP AB

FIRST WIRELESS COMMUNICATION APPARATUS 300

SECOND WIRELESS COMMUNICATION APPARATUS 400

MCIM IS SHARED BY TWO DEVICES (a)

162
MCIM IS SHARED BY THREE DEVICES
GROUP AB

FIRST WIRELESS COMMUNICATION APPARATUS 300

SECOND WIRELESS COMMUNICATION APPARATUS 400

THIRD WIRELESS COMMUNICATION APPARATUS 410

GROUP MANAGEMENT DATABASE 220

|   | GROUP NAME 221 | GROUP ID 222 | GROUP PASSWORD 223 | DEVICE NAME 224 | TERMINAL IDENTIFICATION INFORMATION 225 | VALID/INVALID INFORMATION 226 |
|---|---|---|---|---|---|---|
| 1 | GROUP AB | 123456789 | poiuytr | MY KEITAI CHAN | PCID#1 | VALID |
|   |          |           |         | MY BOOK | PCID#2 | INVALID |
| 2 | ... | ... | ... | ... | ... | ... |
| ⋮ | ⋮ | ⋮ | ⋮ | ⋮ | ⋮ | ⋮ |
| M | ... | ... | ... | ... | ... | ... |

(a)

⬇ ADD THIRD WIRELESS COMMUNICATION APPARATUS (PCID#3) TO "GROUP AB"

GROUP MANAGEMENT DATABASE 220

|   | GROUP NAME 221 | GROUP ID 222 | GROUP PASSWORD 223 | DEVICE NAME 224 | TERMINAL IDENTIFICATION INFORMATION 225 | VALID/INVALID INFORMATION 226 |
|---|---|---|---|---|---|---|
| 1 | GROUP AB | 123456789 | poiuytr | MY KEITAI CHAN | PCID#1 | VALID |
|   |          |           |         | MY BOOK | PCID#2 | INVALID |
|   |          |           |         | PASOKON KUN | PCID#3 | INVALID |
| 2 | ... | ... | ... | ... | ... | ... |
| ⋮ | ⋮ | ⋮ | ⋮ | ⋮ | ⋮ | ⋮ |
| M | ... | ... | ... | ... | ... | ... |

227

(b)

FIG. 7
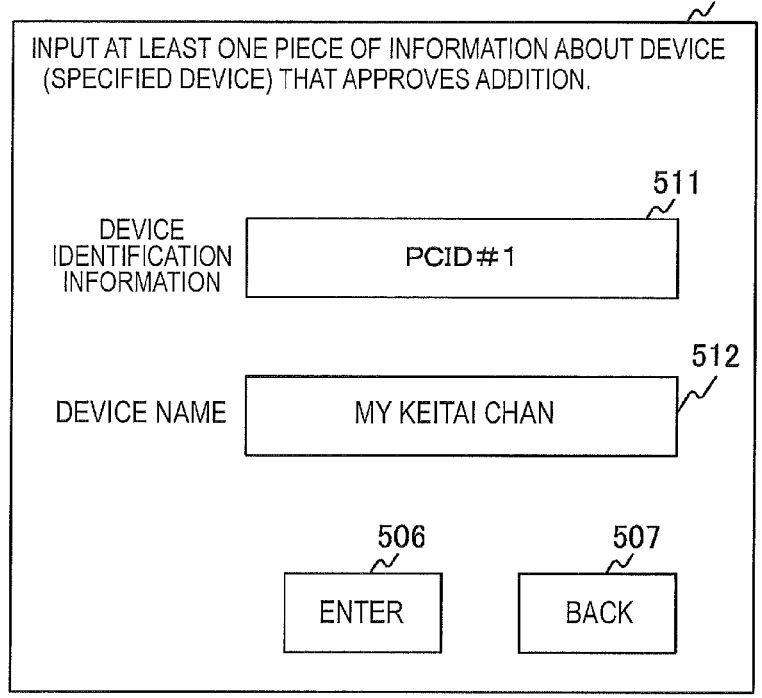
(a)
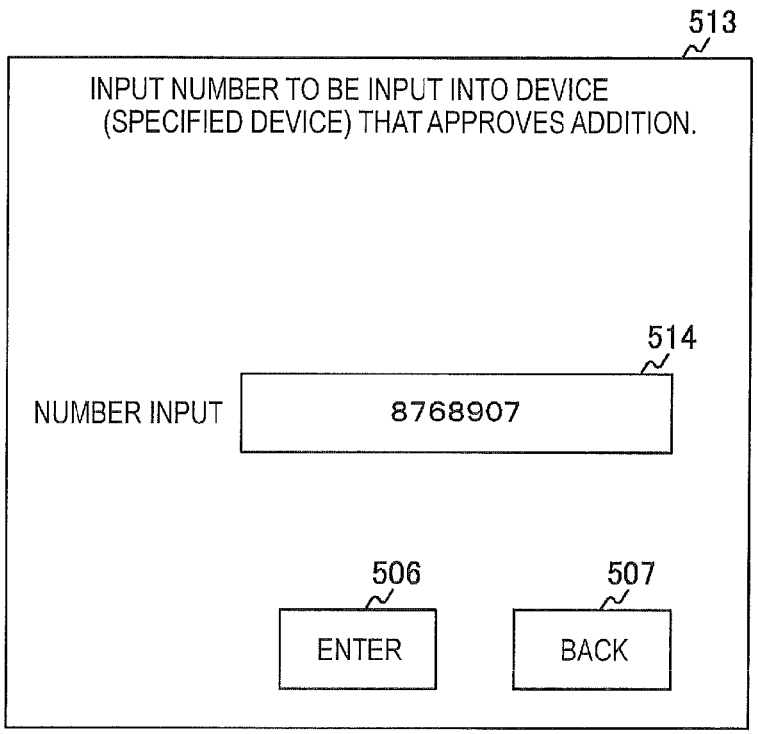
(b)

FIG. 8
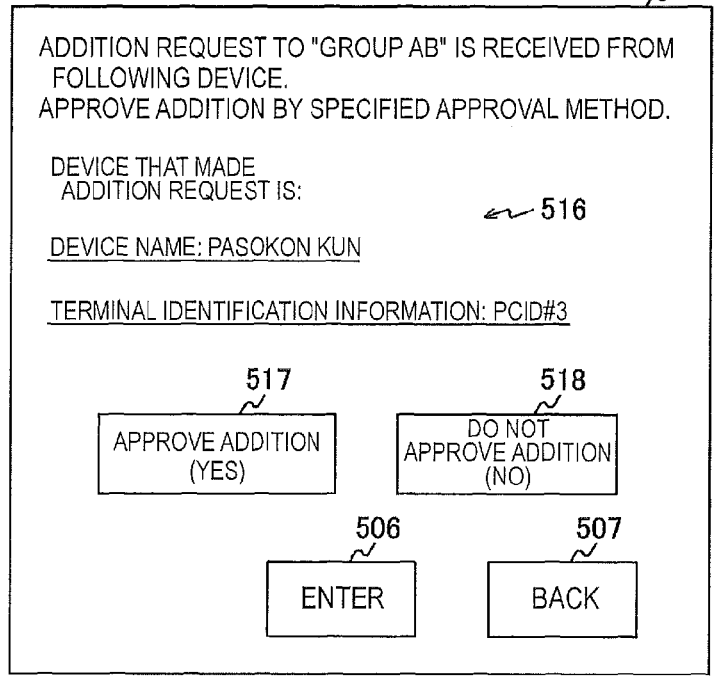
(a)
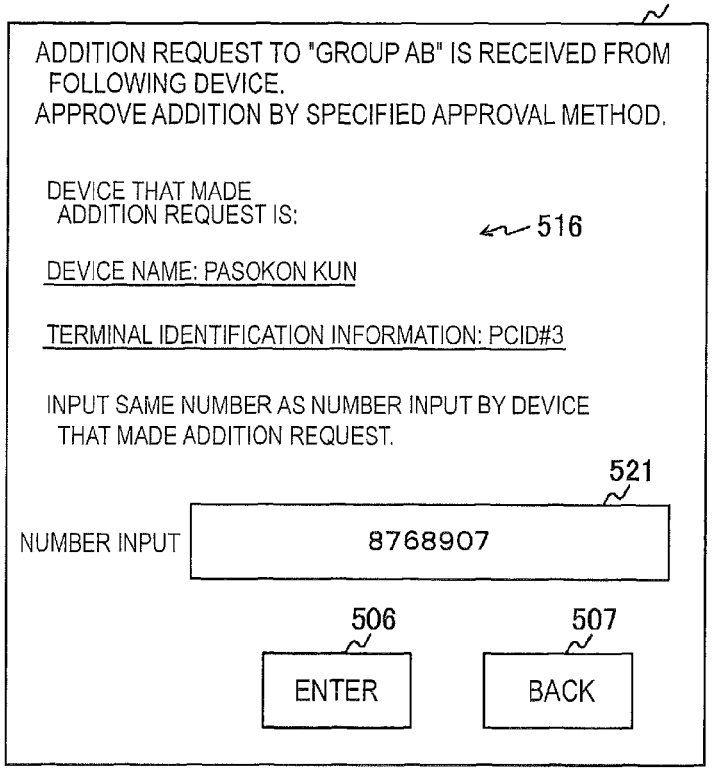
(b)

FIG. 9
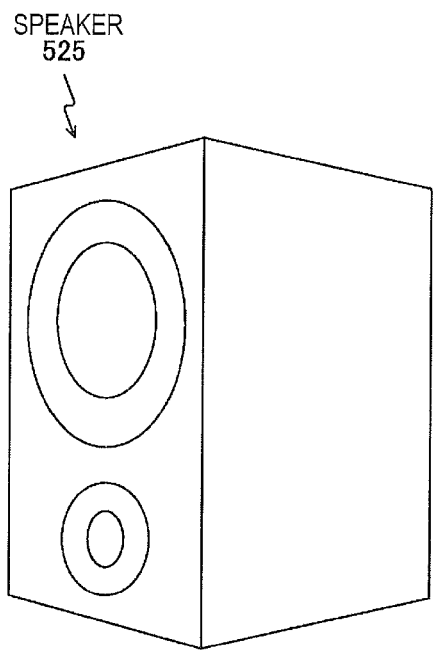
(a)
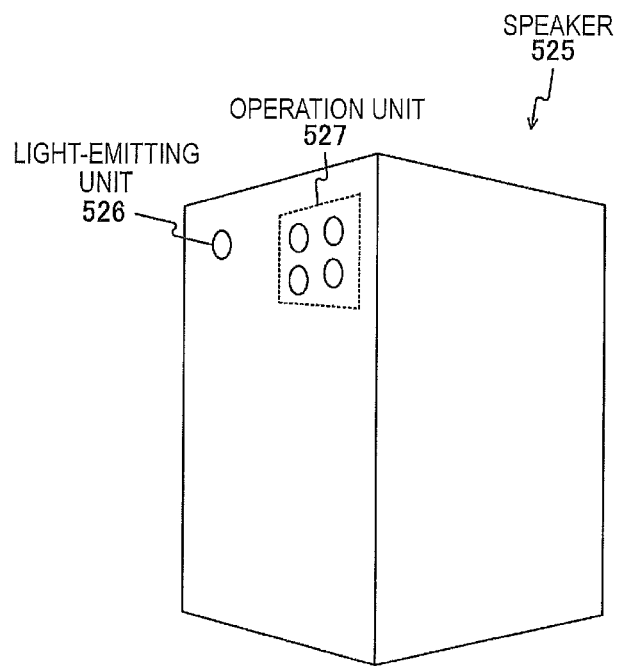
(b)

FIG. 17
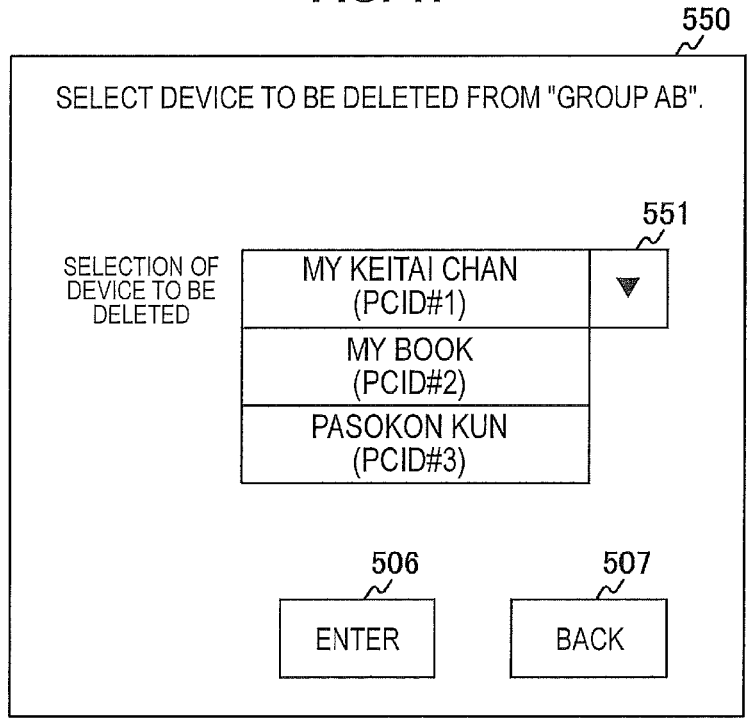
(a)
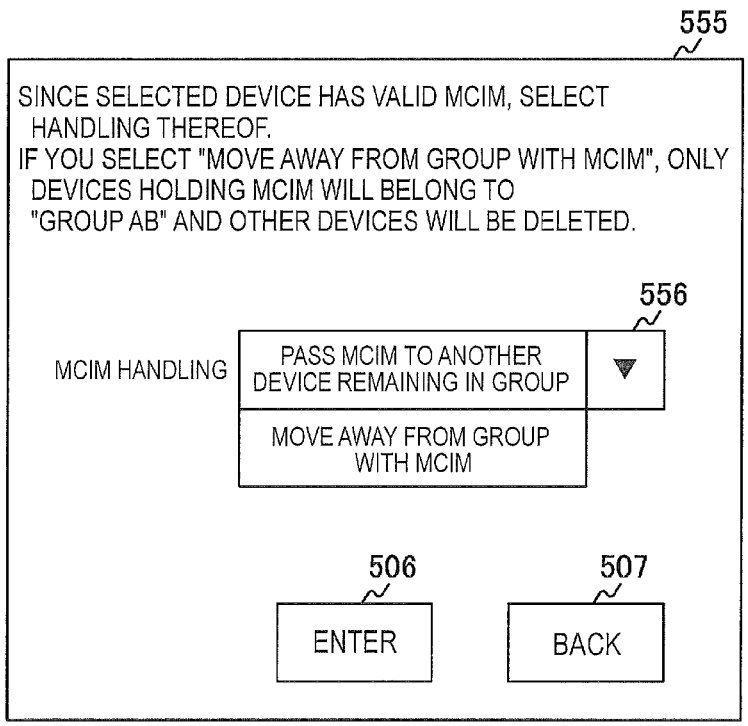
(b)

DELETION PROCESSING FROM "GROUP AB" OF REQUESTED GROUP DELETION IS COMPLETED.

HENCEFORTH, MCIM OF "GROUP AB" WILL NOT BE USABLE.

561

CONFIRM

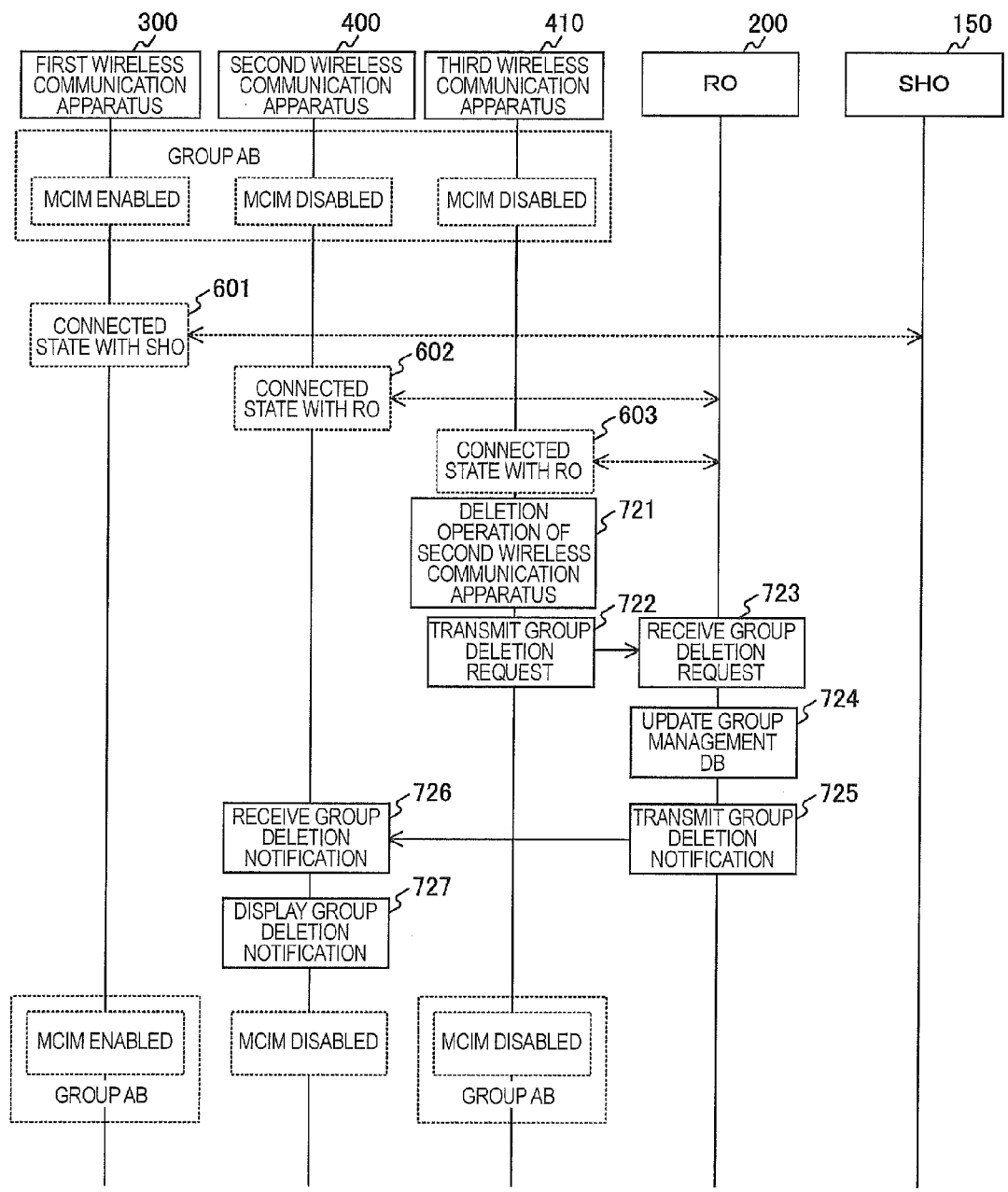

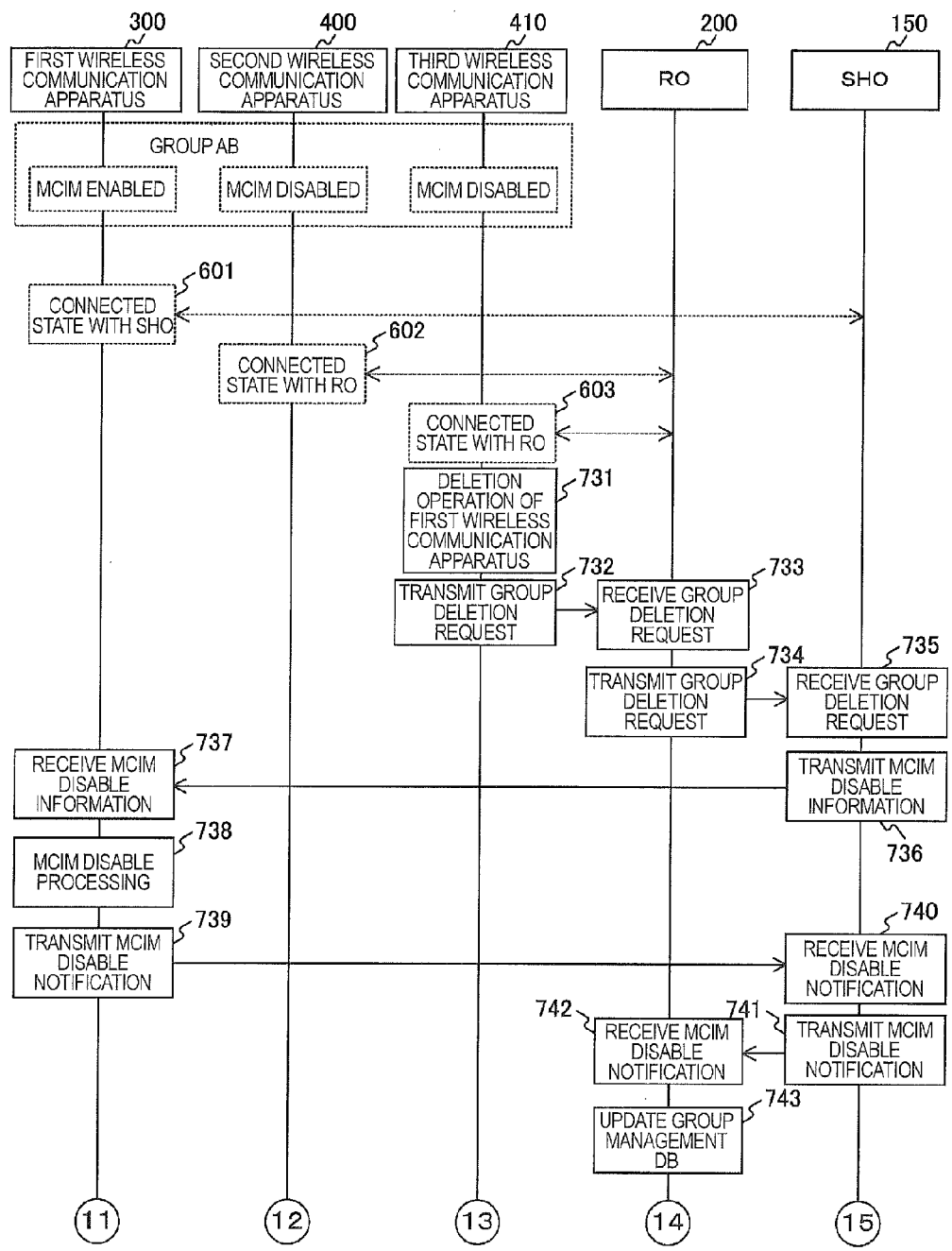

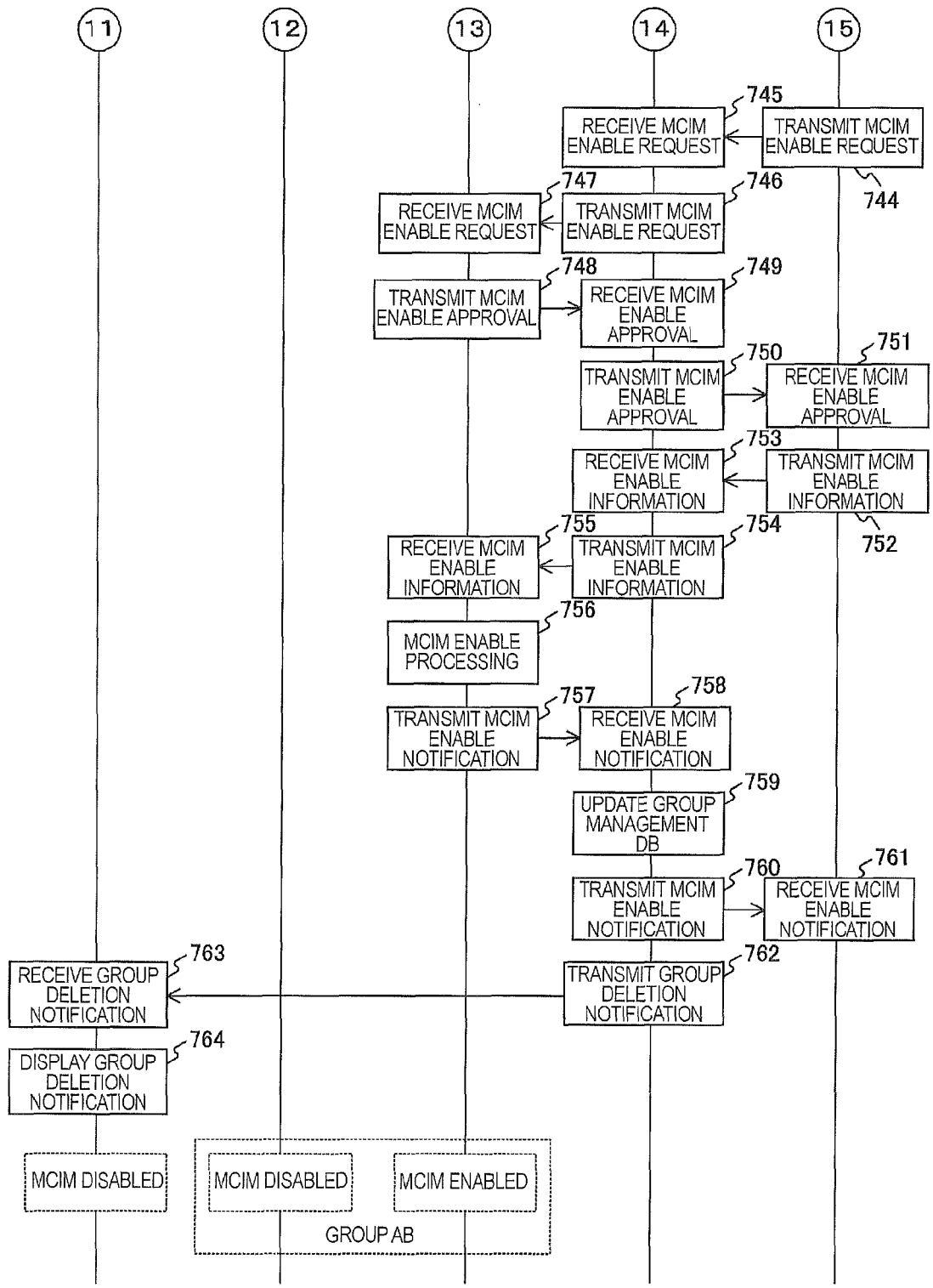

WIRELESS COMMUNICATION APPARATUS, COMMUNICATION SYSTEM AND CONTROL METHOD OF WIRELESS COMMUNICATION APPARATUS

TECHNICAL FIELD

The present technology relates to a wireless communication apparatus. More specifically, the present technology relates to a wireless communication apparatus connected to a network, a communication system including the apparatus, and a control method of a wireless communication apparatus.

BACKGROUND ART

Currently, 3GPP (3rd Generation Partnership Project) drawing up technical specifications of public wireless communication networks is working on a function extension (see, for example, Non-Patent Literature 1).

According to the function extension (called Machine to Machine Equipment), information indicating service availability can flexibly be used. The information indicating service availability is MCIM (Machine Communication Identity Module). For example, MCIM can be downloaded from a network, temporarily stopped, or restarted.

Currently, information corresponding to the MCIM needs to be stored in a physical device called an SIM (Subscriber Identity Module) card. However, by handling MCIM as software, the method of storing the MCIM can also be made flexible.

CITATION LIST

Non-Patent Literature

Non-Patent Literature 1: 3GPP TR 33.812 V9.2.0(2010-06)

SUMMARY OF INVENTION

Technical Problem

By using the above function extension, the method of using MCIM that is different from a conventional method can now be considered.

For example, sharing MCIM among a plurality of wireless communication apparatuses can be assumed. In such a case, it is important to perform an operation of the sharing easily and also to maintain safety of the sharing.

The present technology is developed in view of the above circumstances and an object thereof is to easily share rights to connect to a network among a plurality of wireless communication apparatuses and to maintain safety of the sharing.

Solution to Problem

The present technology is provided to solve the above-mentioned issues. According to a first embodiment of the present technology, there is provided a wireless communication apparatus, a control method of the same, and a program for causing a computer to execute the method, the wireless communication apparatus including a reception unit that receives group information to identify a group as an operation input for additional registration with the group including a plurality of wireless communication apparatuses sharing a network connection right to connect to a predetermined network via a wireless line, and a control unit that, when the group information is received, transmits an addition request that requests the additional registration with the group to a management system that manages the group via a wireless line on condition that an approval operation has been performed by one of the wireless communication apparatuses included in the group. Accordingly, when group information is received, an action of transmitting the addition request to the management system via the wireless line is caused.

Further, according to the first embodiment, when the addition request is received, the management system may additionally register the wireless communication apparatus having transmitted the addition request with the group on condition that the approval operation has been performed. Accordingly, when an addition request is received, an action of adding and registering the wireless communication apparatus having transmitted the addition request with the group is caused on condition that an approval operation has been performed.

Further, according to the first embodiment, the reception unit may receive wireless communication apparatus information to identify the wireless communication apparatus that performs the approval operation. The control unit may include the wireless communication apparatus information in the addition request, and transmits the included wireless communication apparatus information. When the addition request is received, the management system may additionally register the wireless communication apparatus having transmitted the addition request with the group on condition that the approval operation has been performed by the wireless communication apparatus related to the wireless communication apparatus information included in the addition request. Accordingly, when an addition request is received, an action of adding and registering the wireless communication apparatus having transmitted the addition request with the group is caused on condition that an approval operation has been performed by the wireless communication apparatus related to wireless communication apparatus information included in the addition request.

Further, according to the first embodiment, the reception unit may receive approval method information to identify an approval method when performing the approval operation. The control unit may include the approval method information in the addition request, and transmits the included approval method information. When the addition request is received, the management system may additionally register the wireless communication apparatus having transmitted the addition request with the group on condition that the approval operation has been performed by the approval method related to the approval method information included in the addition request. Accordingly, when an addition request is received, an action of adding and registering the wireless communication apparatus having transmitted the addition request with the group is caused on condition that an approval operation has been performed by the approval method related to approval method information included in the addition request.

Further, according to the first embodiment, the reception unit may receive the approval method information that identifies one of the approval method of approving the addition request by a selection operation, the approval method of approving the addition request by an input operation of identification information, and the approval method of approving the addition request by an operation of an operation member. Accordingly, an action of receiving approval method information identifying one of a plurality of approval methods is caused.

Further, according to the first embodiment, if the wireless communication apparatus that performs the approval operation holds the network connection right, the management system transmits an addition approval request that requests that the approval operation is performed to the wireless communication apparatus through a connection based on the network connection right. Accordingly, if the wireless communication apparatus that performs an approval operation holds network connection rights, an action of transmitting an addition approval request that requests to perform an approval operation to the wireless communication apparatus through a connection based on the network connection rights is caused.

Further, according to the first embodiment, when a notification indicating and the additional registration with the group in accordance with the addition request is received from the management system, the control unit may cause a display unit to display the additional registration with the group. Accordingly, when a notification indicating addition and registration with a group in accordance with an addition request is received, an action of causing a display unit to display the addition and registration with the group is caused.

Further, according to the first embodiment, the reception unit may receive an operation input to delete one of the wireless communication apparatuses included in the group from the group. When the operation input to delete the one of the wireless communication apparatuses is received, the control unit may transmit a deletion request to delete the one of the wireless communication apparatuses to be deleted from the group to the management system. The management system may perform deletion processing on the one of the wireless communication apparatuses to be deleted from the group. Accordingly, when an operation input to delete is received, an action of transmitting the deletion request to the management system and deletion processing of the wireless communication apparatus to be deleted being performed by the management system is caused.

Further, according to the first embodiment, the reception unit may receive identification information and a password attached to the group as the group information. Accordingly, an action of receiving identification information and a password attached to a group as group information is caused.

Further, according to the first embodiment, the network connection right may be a right to connect to a base station based on contract authentication information to connect to the base station operated by a communication operator. Accordingly, an action of sharing rights to connect to a base station based on the contract authentication information is caused.

Further, according to the first embodiment, the management system may be an RO (Registration Operator). Accordingly, when group information is received, an action of transmitting the addition request to the RO via the wireless line is caused.

Further, according to the first embodiment, among the plurality of wireless communication apparatuses included in the group, a wireless communication apparatus holding the network connection right may be connectable to an SHO (Selected Home Operator) on the basis of the network connection right. Among the plurality of wireless communication apparatuses included the group, a wireless communication apparatus other than the wireless communication apparatus holding the network connection right may be connectable only to an RO (Registration Operator). Accordingly, an action of wireless communication apparatuses holding network connection rights being connected to the SHO based on the network connection rights and wireless communication apparatuses other than the wireless communication apparatuses holding the network connection rights being connected to the RO only is caused.

Further, according to a second embodiment of the present technology, there is provided a communication system, a control method of the same, and a program for causing a computer to execute the method, the communication system including a wireless communication apparatus including a control unit that, when group information to identify a group as an operation input for additional registration with the group including a plurality of wireless communication apparatuses sharing a network connection right to connect to a predetermined network via a wireless line is received, transmits an addition request that requests and the additional registration with the group to an information processing apparatus that manages the group via a wireless line on condition that an approval operation has been performed by one of the wireless communication apparatuses included in the group, and an information processing apparatus including a control unit that, when the addition request is received from another wireless communication apparatus other than the plurality of wireless communication apparatuses included in the group, transmits an addition approval request that causes one of the wireless communication apparatuses included in the group to perform an approval operation on the addition request via a wireless line and additionally registers the wireless communication apparatus having transmitted the addition request with the group on condition that an addition approval result indicating that the approval operation has been performed on the addition request is received from the wireless communication apparatus to which the addition approval request has been transmitted. Accordingly, the wireless communication apparatus may transmit an addition request to the information processing apparatus via the wireless line when group information is received and the information processing apparatus may transmit an addition approval request via the wireless line when the addition request is received from the other wireless communication apparatus than the plurality of wireless communication apparatuses included in a group to add and register the wireless communication apparatus having transmitted the addition request with the group on condition that an addition approval result indicating that an approval operation has been performed is received from the wireless communication apparatus to which the addition approval request has been transmitted.

Advantageous Effects of Invention

According to the present technology, an excellent effect of being able to easily share rights to connect to a network among a plurality of wireless communication apparatuses and to maintain safety of the sharing can be achieved.

BRIEF DESCRIPTION OF DRAWINGS

FIG. 1 is a diagram showing an example of using a plurality of wireless communication apparatuses (devices) according to a first embodiment of the present technology in a simplified manner.

FIG. 2 is a diagram showing a group example when MCIM is shared among the plurality of wireless communication apparatuses according to the first embodiment of the present technology in a simplified manner.

FIG. 4 is a diagram schematically showing a group management database 220 according to the first embodiment of the present technology.

FIG. 7 is a diagram showing a user interface example of each wireless communication apparatus according to the first embodiment of the present technology.

FIG. 8 is a diagram showing a user interface example of each wireless communication apparatus according to the first embodiment of the present technology.

FIG. 9 is a diagram showing a user interface example of each wireless communication apparatus according to the first embodiment of the present technology.

FIG. 17 is a diagram showing display screen examples displayed in each wireless communication apparatus according to the first embodiment of the present technology.

FIG. 18 is a diagram showing a display screen example displayed in each wireless communication apparatus according to the first embodiment of the present technology.

FIG. 24 is a sequence chart showing a communication processing example between each apparatus included in the communication system 100 according to the first embodiment of the present technology.

FIG. 25 is a sequence chart showing a communication processing example between each apparatus included in the communication system 100 according to the first embodiment of the present technology.

FIG. 26 is a sequence chart showing the communication processing example between each apparatus included in the communication system 100 according to the first embodiment of the present technology.

DESCRIPTION OF EMBODIMENT

Figure 3:
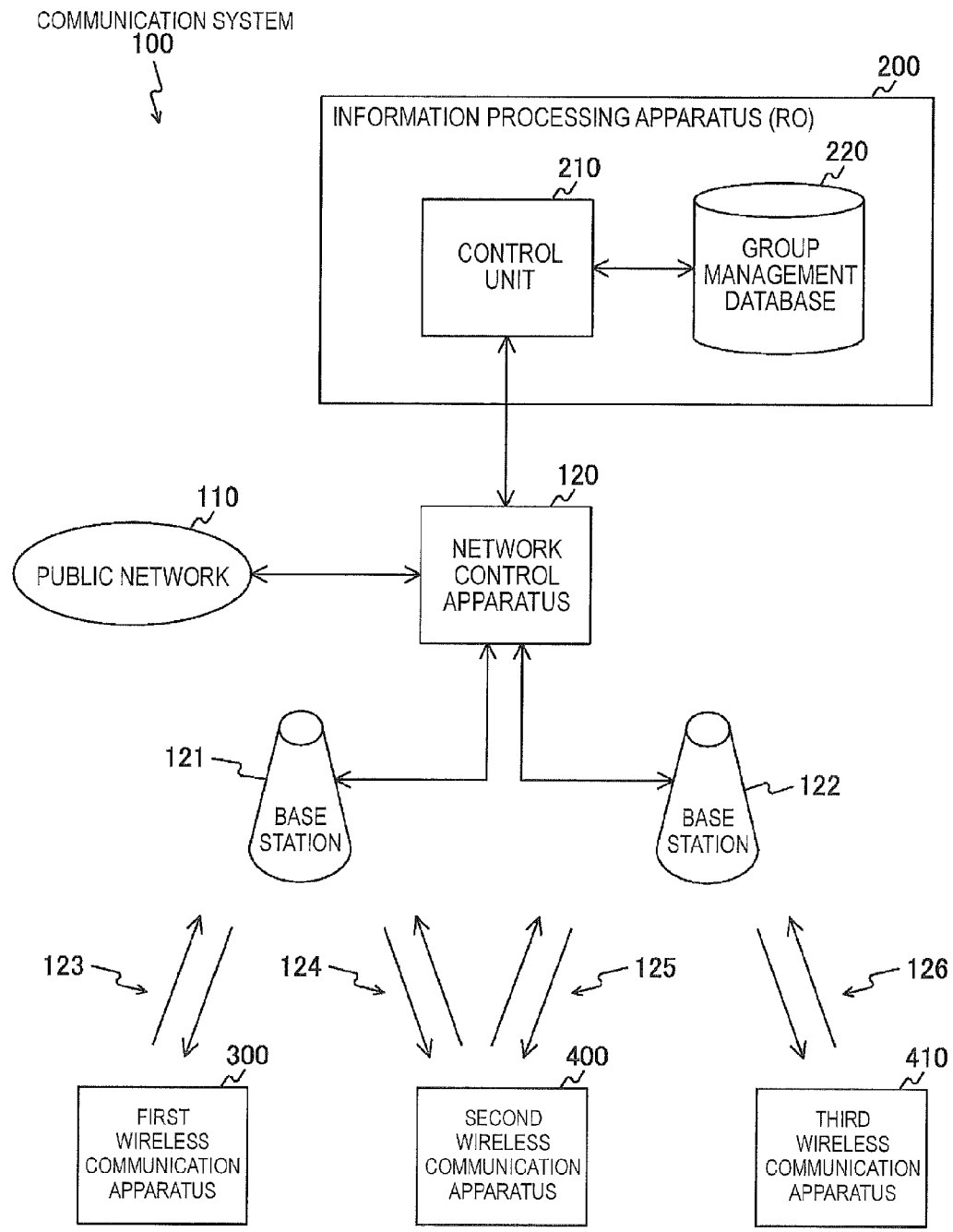
FIG. 3 is a block diagram showing a system configuration example of a communication system 100 according to the first embodiment of the present technology.

A mode (hereinafter, called an embodiment) to carry out the present technology will be described below. The description will be provided in the following order:

1. First embodiment (group addition/deletion control: an example in which a new device is added to a group sharing MCIM and an example in which a device is deleted from the group)

<1. First Embodiment>

[Example of Using Wireless Communication Apparatuses]

FIG. 1 is a diagram showing an example of using a plurality of wireless communication apparatuses (devices) according to the first embodiment of the present technology in a simplified manner.

FIG. 1A shows a state in which a user 10 uses a plurality of wireless communication apparatuses (the first wireless communication apparatus 300 and a second wireless communication apparatus 400). The first wireless communication apparatus 300 is, for example, a mobile phone apparatus (for example, a smartphone) and the second wireless communication apparatus 400 is, for example, an electronic book display apparatus including a wireless communication function.

FIGS. 1B and 1C show transition examples of rights of using MCIM when the MCIM is shared among the plurality of wireless communication apparatuses. Thus, in the first embodiment of the present technology, a network configuration example including an SHO 150 and the RO 200 is shown (see, for example, Non-Patent Literature 1).

The SHO 150 provides an Internet service or the like and corresponds to, for example, a wireless operator (for example, a mobile phone operator) who provides a wireless connection service. The RO 200 provides a service of initial connection registration or the like and is connected to, for example, the SHO 150.

Incidentally, the RO and the SHO represents logical roles and are assumed to be operated by different operators, but may also be assumed to be operated by the same operator. In addition, a plurality of RO or SHO may also be assumed to be present. Further, the RO and the SHO may be configured integrally as an information processing apparatus or by a plurality of apparatuses.

In FIGS. 1B and 1C, the wireless communication apparatus holding the valid MCIM is indicated by a thick line. That is, FIG. 1B shows a case in which the first wireless communication apparatus 300 holds the valid MCIM and FIG. 1C shows a case in which the second wireless communication apparatus 400 holds the valid MCIM. Also, as shown in FIGS. 1B and 1C, the first wireless communication apparatus 300 or the second wireless communication apparatus 400 can be connected to the SHO 150 only when holding the valid MCIM (301, 402). In contrast, the wireless communication apparatus holding no valid MCIM can be connected to the RO 200 based on PCID (Provisional Connectivity Identity) (401, 302).

MCIM is an example of contract authentication information and the contract authentication information is information including subscriber information of a phone and authentication. MCIM is contract authentication information (so-called soft SIM) that is not limited to a specific communication operator (for example, a mobile phone operator) when, for example, a device is purchased and can flexibly be set to a communication operator after the purchase. Holding no valid MCIM means, for example, holding no MCIM itself or holding only MCIM that has been disabled by disable processing of the MCIM.

PCID is a terminal specific identifier (for example, terminal identification information 225 shown in FIG. 4) and is attached to all wireless communication apparatuses (devices).

Thus, when the right of using MCIM is shared among a plurality of wireless communication apparatuses, the plurality of wireless communication apparatuses involved in the sharing can be set as a group. Such a group example is shown in FIG. 2.

[Group Example Sharing MCIM]

FIG. 2 is a diagram showing a group example when MCIM is shared among the plurality of wireless communication apparatuses according to the first embodiment of the present technology in a simplified manner.

FIG. 2A shows an example in which the third wireless communication apparatus 410 is added to a group AB (indicated by a dotted line rectangle 161) including the first wireless communication apparatus 300 and the second wireless communication apparatus 400. The "group AB" is a name (for example, a group name 221 shown in FIG. 4) given to the group. The third wireless communication apparatus 410 is, for example, an information processing apparatus (for example, a notebook personal computer) including a wireless communication function.

FIG. 2B shows a case in which the group AB (indicated by a dotted line rectangle 162) includes three devices after the third wireless communication apparatus 410 being added to the group AB (indicated by the dotted line rectangle 161) shown in FIG. 2A

In addition, the user 10 can cause the desired device of the three devices included in the group AB (indicated by a dotted line rectangle 162) shown in FIG. 2B to be deleted.

Here, when a new device is added and registered with a group, it is preferable to be able to perform an addition operation thereof easily. In addition to making the addition operation easy, it is important to maintain safety so that an unintended device is not added. Thus, performing the addition operation by using the ID and password can be considered. However, if the ID or password is known to a third party, maintaining safety of the addition operation is assumed to be difficult. Therefore, in the first embodiment of the present technology, a device is added and registered with the group by performing an addition operation using the ID and password and also on condition that addition approval is gained from another device belonging to the group.

[Configuration Example of the Communication System]

FIG. 3 is a block diagram showing a system configuration example of the communication system 100 according to the first embodiment of the present technology.

The communication system 100 includes a public network 110, a network control apparatus 120, the information processing apparatus (RO) 200, base stations 121, 122, the first wireless communication apparatus 300, the second wireless communication apparatus 400, and third wireless communication apparatus 410.

The public network 110 is a public network such as a telephone network and the Internet. The public network 110 and the network control apparatus 120 are connected via a gateway (not shown).

The network control apparatus 120 is a communication controller managed by a wireless operator providing a wireless connection service and includes an authentication controller (not shown). The authentication controller exercises authentication control of a wireless communication apparatus connected via the base stations 121, 122. The authentication controller of the network control apparatus 120 authenticates, among wireless communication apparatuses connected via the base stations 121, 122, excluding specific cases, wireless communication apparatuses holding valid MCIM (contract authentication information). Then, the network control apparatus 120 connects the authenticated wireless communication apparatus to the public network 110 via the gateway (not shown).

In addition, the network control apparatus 120 is connected to the information processing apparatus (RO) 200 to exchange various kinds of information with the information processing apparatus (RO) 200. A wireless communication apparatus holding no valid MCIM (contract authentication information) can connect (limited connection) to the information processing apparatus (RO) 200 via the network control apparatus 120 based on PCID of the wireless communication apparatus.

The base stations 121, 122 are mobile communication base stations (NodeB) that connect the first wireless communication apparatus 300, the second wireless communication apparatus 400, and the third wireless communication apparatus 410 and the network control apparatus 120 via wireless lines 123 to 126.

In the communication system 100, for example, each wireless communication apparatus is connected to the base stations 121, 122 via the wireless lines 123 to 126 and to the network control apparatus 120 via the base stations 121, 122. Each wireless communication apparatus is also connected to the information processing apparatus (RO) 200 via the network control apparatus 120. Incidentally, each of the first wireless communication apparatus 300, the second wireless communication apparatus 400, and the third wireless communication apparatus 410 can connect to any of the base stations 121, 122 in accordance with the position used. In the communication system 100, the network control apparatus 120 and the base stations 121, 122 correspond to SHO.

The information processing apparatus (RO) 200 provides a service such as initial connection registration and includes a control unit 210 and the group management database 220. The information processing apparatus (RO) 200 is an example of an information processing apparatus and a management system described in claims.

The control unit 210 exercises various kinds of control of a wireless communication apparatus connected via the network control apparatus 120. For example, the control unit 210 receives a group addition request that requests additional registration with a group including a plurality of wireless communication apparatuses sharing network connection rights from a wireless communication apparatus other than the plurality of wireless communication apparatuses included in the group. When such a group addition request is received, the control unit 210 transmits a group addition approval request to one of the wireless communication apparatuses included in the group via a wireless line to cause the wireless communication apparatus to perform an approval operation of the group addition request. The network connection rights are rights to connect to a predetermined network (for example, the public network 110) via a wireless line and correspond to, for example, rights of using MCIM. That is, the network connection rights are rights to connect to a base station operated by a communication operator based on MCIM (contract authentication information) to connect to the base station. For example, the presence/absence of network connection rights can be decided based on the presence/absence of rights to use MCIM.

For example, the control unit 210 adds and registers the wireless communication apparatus having transmitted the addition request to the group with the group on condition that a group addition approval result indicating that an approval operation of the group addition request has been performed is received from the wireless communication apparatus to which the group addition approval request has been transmitted. That is, the control unit 210 updates the group management database 220 to add and register the wireless communication apparatus having transmitted the group addition request with the group.

The group management database 220 is a database to manage a group including a plurality of wireless communication apparatuses sharing MCIM. The group management database 220 will be described in detail with reference to FIG. 4.

Here, an example of transferring rights of using MCIM in the communication system 100 will be described. For example, each wireless communication apparatus is caused to hold MCIM. Then, rights of using MCIM can be transferred by enabling/disabling of the MCIM in each wireless communication apparatus based on control of the control unit 210.

Rights of using MCIM may be transferred, instead of causing each wireless communication apparatus to hold MCIM, by transferring MCIM itself. For example, a case when rights of using MCIM are transferred from the first wireless communication apparatus 300 to the second wireless communication apparatus 400 is assumed. For example, an MCIM transfer request is transmitted from the first wireless communication apparatus 300 to the control unit 210. In this case, MCIM held by the first wireless communication apparatus 300 is disabled (erased) based on control of the control unit 210 and transfer information (setting information including MCIM) is transmitted from the network control apparatus 120 to the second wireless communication apparatus 400 via the control unit 210. By causing the second wireless communication apparatus 400 to hold the MCIM included in the transfer information, valid MCIM is set to the second wireless communication apparatus 400.

[Configuration Example of the Group Management Database]

FIG. 4 is a diagram schematically showing the group management database 220 according to the first embodiment of the present technology. FIG. 4A shows a case when the first wireless communication apparatus 300 and the second wireless communication apparatus 400 are registered with the group AB. FIG. 4B shows a case when the third wireless communication apparatus 410 is added and registered with the group AB shown in FIG. 4A.

In the group management database 220, the group name 221, a group ID 222, a group password 223, a device name 224, the terminal identification information 225, and valid/invalid information 226 are associated in groups and recorded. The above information is successively updated by the control unit 210 based on, for example, each request (a group addition request, a group deletion request) from each wireless communication apparatus.

The name given to a group is stored in the group name 221. The name is stored, for example, when a group is created.

The ID given to a group is stored in the group ID 222. The password given to a group is stored in the group password 223. A group addition request is made by using the ID and password.

The name given to a device is stored in the device name 224. The name is stored, for example, during additional registration with a group.

The terminal identification number of a wireless communication apparatus (device) is stored in the terminal identification information 225. The terminal identification information is identification information to identify the wireless communication apparatus and, for example, PCID is stored therein. In FIG. 4, "PCID#1" of the terminal identification information 225 is assumed to correspond to the first wireless communication apparatus 300. Similarly, it is assumed that "PCID#2" of the terminal identification information 225 corresponds to the second wireless communication apparatus 400 and the "PCID#3" of the terminal identification information 225 corresponds to the third wireless communication apparatus 410.

Information indicating whether MCIM in a wireless communication apparatus is valid or invalid (or not holding MCIM) is stored in the valid/invalid information 226. To make the description easier, "Valid" is shown in a wireless communication apparatus in which MCIM is valid and "Invalid" is shown in a wireless communication apparatus in which MCIM is invalid in FIG. 4.

[Configuration Example of the Wireless Communication Apparatus]

Figure 5:
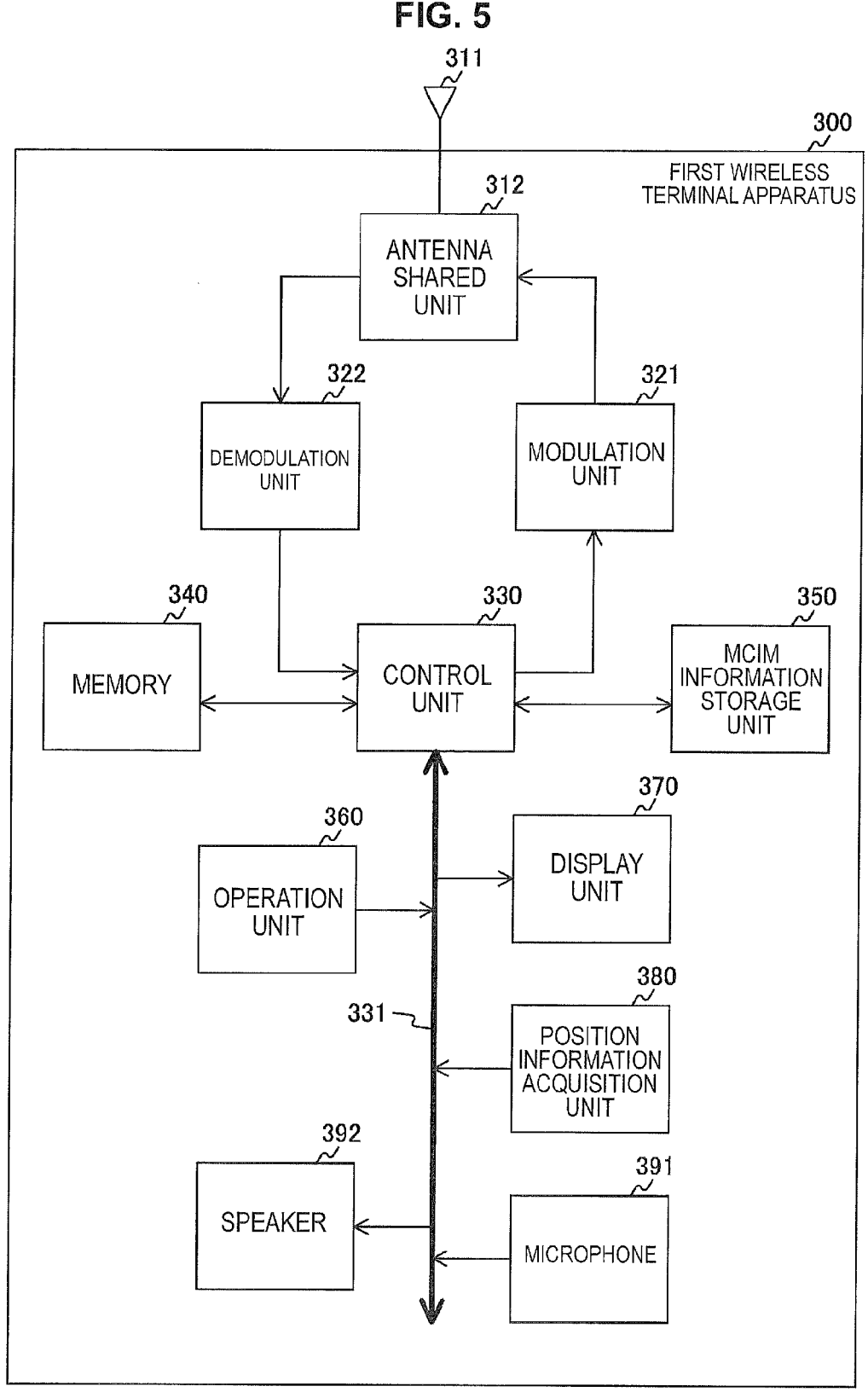
FIG. 5 is a block diagram showing an internal configuration example of a first wireless communication apparatus 300 according to the first embodiment of the present technology.

FIG. 5 is a block diagram showing an internal configuration example of the first wireless communication apparatus 300 according to the first embodiment of the present technology. The internal configuration of the second wireless communication apparatus 400 and the third wireless communication apparatus 410 is similar to that of the first wireless communication apparatus 300 and thus, the description thereof here is omitted.

The first wireless communication apparatus 300 includes an antenna 311, an antenna shared unit 312, a modulation unit 321, a demodulation unit 322, a control unit 330, a memory 340, and a MCIM information storage unit 350. The first wireless terminal apparatus 300 also includes an operation unit 360, a display unit 370, a position information acquisition unit 380, a microphone 391, and a speaker 392. In addition, each of the parts is connected by a bus 331. The first wireless communication apparatus 300 is realized by, for example, a mobile phone apparatus capable of performing calls and data communication.

When, for example, reception processing is performed, a radio wave received by the antenna 311 is demodulated by the demodulation unit 322 after going through the antenna shared unit 312 and the demodulated received data is supplied to the control unit 330. If the reception processing is call reception processing, the demodulated received data (audio data) goes through the control unit 330 before being output from the speaker 392 as a voice.

When, for example, transmission processing is performed, transmission data output by the control unit 330 is modulated by the modulation unit 321 and the modulated transmission data is transmitted from the antenna 311 after going through the antenna shared unit 312. If the transmission processing is call transmission processing, audio data input from the microphone 391 is modulated by the modulation unit 321 after going through the control unit 330 and the modulated transmission data (audio data) is transmitted from the antenna 311 after going through the antenna shared unit 312.

The control unit 330 exercises various kinds of control based on a control program stored in the memory 340. The control unit 330 is constituted of, for example, a microprocessor. The control unit 330 is connected to, for example, the modulation unit 321 and the demodulation unit 322 and transmits/receives various kinds of data to/from the network control apparatus 120 connected via the base stations 121, 122. In addition, the control unit 330 performs connection processing to the RO 200 via a wireless line in a limited connection based on PCID without MCIM.

The memory 340 is a memory to store a control program for the control unit 330 to exercise various kinds of control, transmission data, received data and the like. The memory 340 is constituted of, for example, a ROM (Read Only Memory) or RAM (Random Access Memory). Terminal identification information (PCID#1) is recorded in the memory 340 to identify the first wireless communication apparatus 300.

The MCIM information storage unit 350 is a memory to hold MCIM (contract authentication information). As the MCIM information storage unit 350, for example, a UICC (Universal Integrated Circuit) card may be used or a dedicated memory to maintain MCIM securely may be used. When a UICC card is used as the MCIM information storage unit 350, a UICC card capable of performing processing to enable or disable MCIM is used, instead of a UICC card into which MCIM is fixedly written. That is, a UICC card in which the control unit 330 can perform processing to enable or disable MCIM based on transfer information received by the antenna 311 and demodulated. In addition, a UICC card capable of rewriting MCIM is used. The processing to enable or disable MCIM can be performed by enable processing and disable processing defined by 3GPP (Third Generation Partnership Project).

If operation input for additional registration with a group is received by the operation unit 360, the control unit 330 transmits a group addition request thereof to the RO 200 via a wireless line. The group addition request is used to request additional registration of the first wireless communication apparatus 300 with the group on condition that, for example, an approval operation is performed by one of wireless communication apparatuses included in the group.

When a group addition request is received, the RO 200 adds and registers the wireless communication apparatus having transmitted the group addition request with a group on condition that an approval operation is performed by one of wireless communication apparatuses included in the group related to the group addition request.

In addition, the RO 200 adds and registers the wireless communication apparatus having transmitted the group addition request with the group on condition that an approval operation is performed by a wireless communication apparatus related to wireless communication apparatus information (approval device information) included in the group addition request.

In addition, the RO 200 adds and registers the wireless communication apparatus having transmitted the group addition request with the group on condition that an approval operation is performed by an approval method related to approval method information included in the group addition request.

If, for example, operation input to delete one of wireless communication apparatuses included in a group from the group is received, the control unit 330 transmits a group deletion request to delete the wireless communication apparatus to be deleted from the group to the RO 200. Then, the RO 200 performs deletion processing of the wireless communication apparatus to be deleted from the group.

The operation unit 360 is an operation reception unit that receives an operation input operated by the user and outputs a signal corresponding to the received operation input to the control unit 330. The operation unit 360 includes, for example, various keys such as numeric keys and alphabetical keys and receives an instruction operation (predetermined operation) by the user instructing a group addition request. The operation unit 360 is an example of a reception unit described in claims.

The display unit 370 is a display unit that displays various kinds of information (character information, time information and the like) based on control of the control unit 330. The display unit 370 displays, for example, each piece of information (for example, display screens shown in FIGS. 6 to 8, and 10) related to the group addition request. As the display unit 370, for example, a display panel such as an organic EL (Electro Luminescence) panel and LCD (Liquid Crystal Display) panel can be used. The operation unit 360 and the display unit 370 can integrally be configured by using a touch panel in which operation input can be done by the display surface thereof being touched by a finger of the user or a finger of the user being brought closer to the display surface.

The position information acquisition unit 380 acquires position information indicating the position where the first wireless communication apparatus 300 is located and outputs the acquired position information to the control unit 330. The position information acquisition unit 380 can be realized by a GPS (Global Positioning System) unit that calculates position information based on a GPS signal received by a GPS signal receiving antenna (not shown). The calculated position information includes each piece of data on the position such as the latitude, longitude, altitude and the like when the GPS signal is received. Alternatively, a position information acquisition apparatus that acquires position information by a different acquisition method of position method may be used. For example, a position information acquisition apparatus that acquires position information by deriving position information by using access point information by wireless LAN (Local Area Network) present therearound.

[Communication Example when Addition Approval is Sought from a Device Holding Valid MCIM]

FIGS. 6 to 10 are diagrams showing user interface examples of each wireless communication apparatus according to the first embodiment of the present technology. These user interfaces will be described in detail with reference to the sequence chart shown in FIG. 11.

Figure 11:
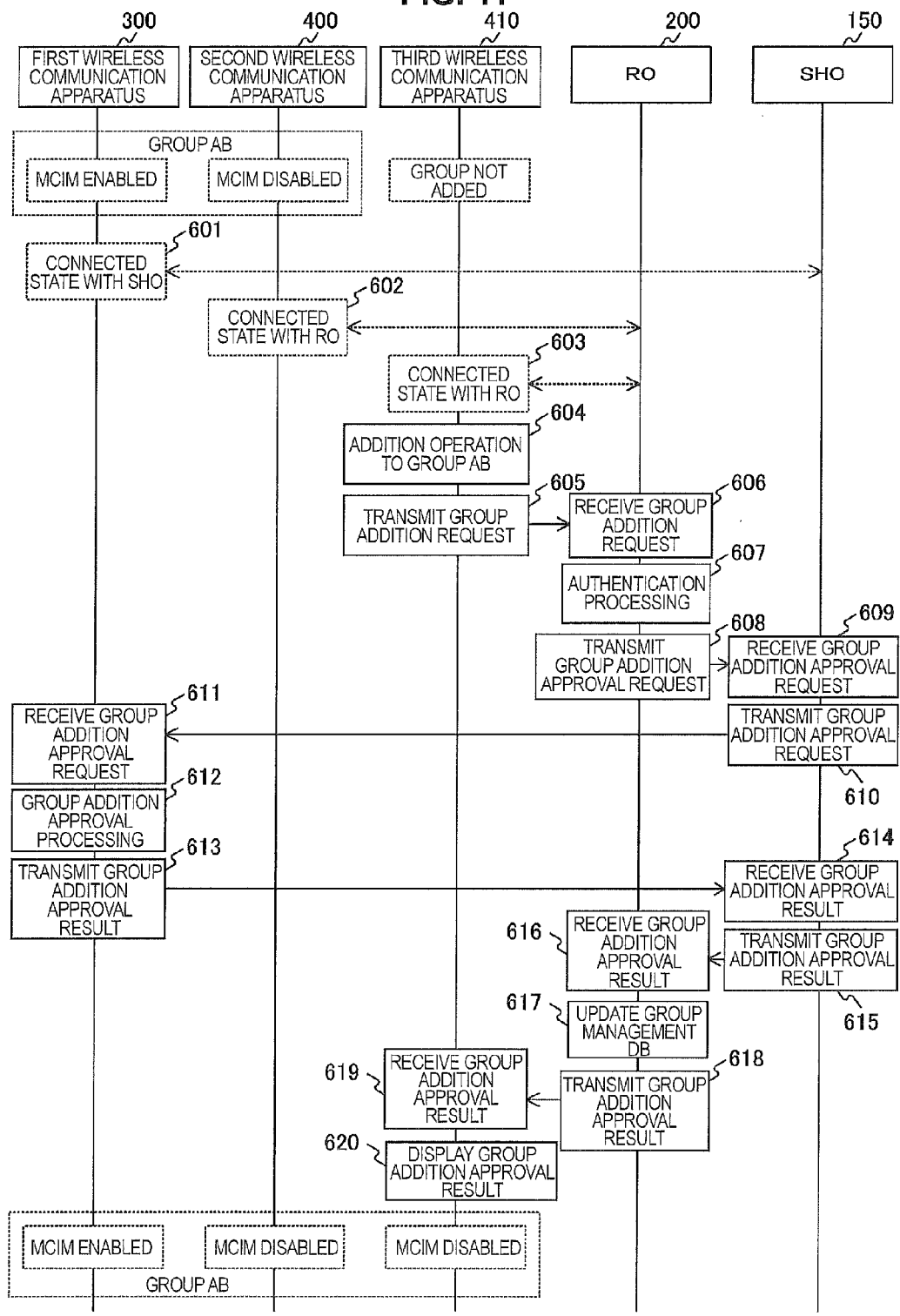
FIG. 11 is a sequence chart showing a communication processing example between each apparatus included in the communication system 100 according to the first embodiment of the present technology.

FIG. 11 is a sequence chart showing a communication processing example between each apparatus included in the communication system 100 according to the first embodiment of the present technology.

The description will be provided by assuming in FIG. 11 that the "group AB" includes the first wireless communication apparatus 300 and the second wireless communication apparatus 400 and the first wireless communication apparatus 300 holds valid MCIM. In FIG. 11, an case in which the third wireless communication apparatus 410 that is not added to the "group AB" is added and registered with the "group AB" by operating the third wireless communication apparatus 410 is taken as an example. An example in which in this case, group addition approval is requested from the first wireless communication apparatus 300 holding valid MCIM will be described. In FIG. 11, it is assumed that the first wireless communication apparatus 300 is in a connected state (601) with the SHO 150 and the second wireless communication apparatus 400 and the third wireless communication apparatus 410 are in connected states (602, 603) with the RO 200.

First, a display screen to add the third wireless communication apparatus 410 to the "group AB" is displayed in the display unit 370 of the third wireless communication apparatus 410.

Figure 6:
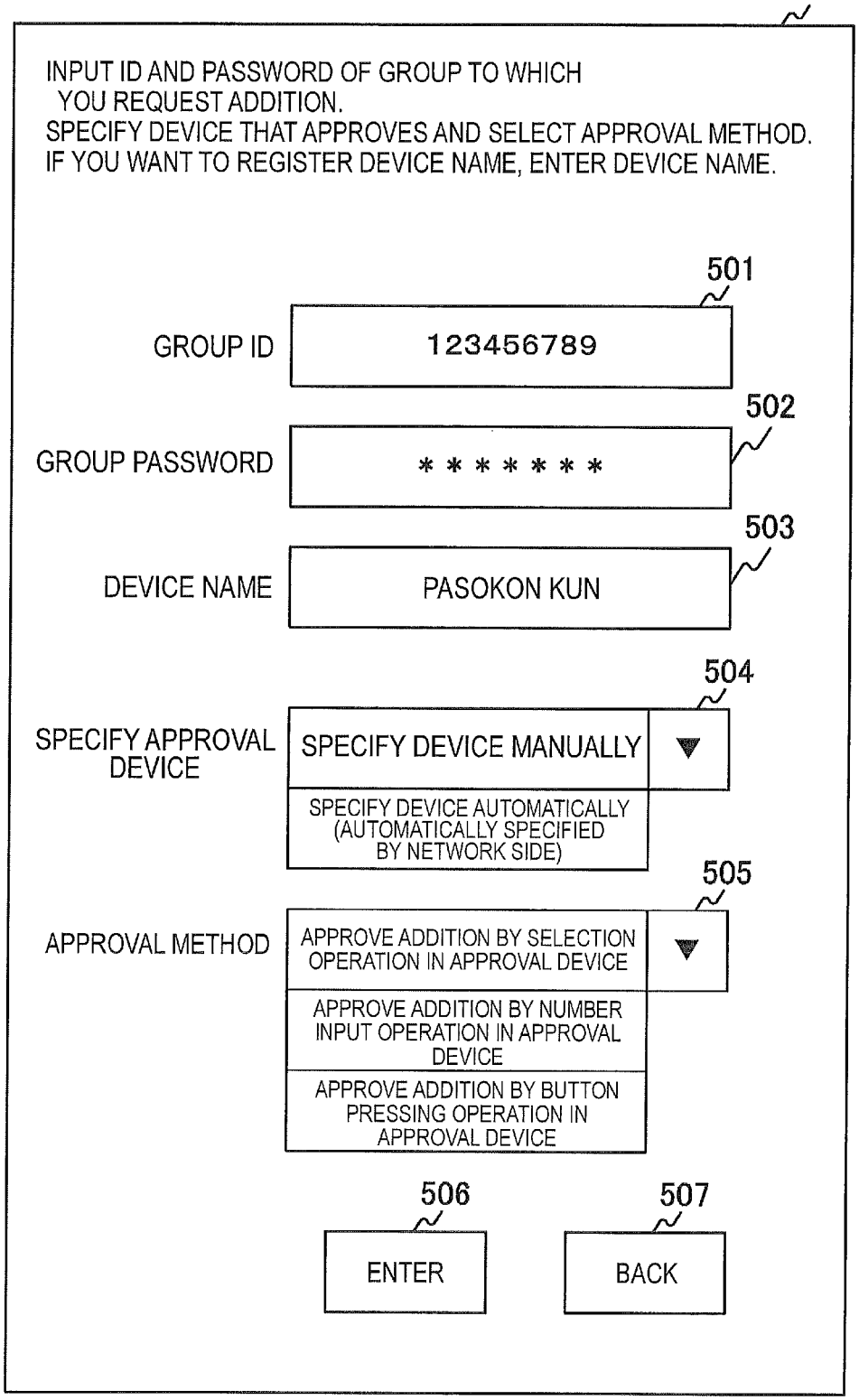
FIG. 6 is a diagram showing a user interface example of each wireless communication apparatus according to the first embodiment of the present technology.

In FIGS. 6 and 7, examples (display screens 500, 510, 513) of the display screen to perform an addition operation are shown.

The display screen 500 shown in FIG. 6 is a display screen to perform an addition operation to add the third wireless communication apparatus 410 to the "group AB". In the display screen 500, an ID input field 501 of a group, a password input field 502 of a group, a device name input field 503, an approval device specifying area 504, an approval method selection area 505, a enter button 506, and a back button 507 are provided.

The ID input field 501 of a group is an area to input the ID of a group to which the third wireless communication apparatus 410 should be added.

The password input field 502 of a group is an area to input the password of a group to which the third wireless communication apparatus 410 should be added.

The device name input field 503 is an area to input the device name to be stored in the device name 224 of the group management database 220. When the registration of the device name is not needed, the input thereof can be omitted.

The approval device specifying area 504 is an area to specify the device that gives approval to a group addition request. If, for example, the pull-down button (▼) is pressed, "Specify device manually" and "Specify device automatically" are listed. Then, one of "Specify device manually" and "Specify device automatically" that are listed can be selected. If, for example, "Specify device manually" is selected, the display screen 510 shown in FIG. 7A is displayed and the device desired by the user can be specified in the display screen 510. If "Specify device automatically" is selected, the device that approves a group addition request is automatically specified by the RO 200.

The approval method selection area 505 is an area to select the approval method of a group addition request. If, for example, the pull-down button (▼) is pressed, "Approve addition by selection operation in approval device", "Approve addition by number input operation in approval device", and "Approve addition by button pressing operation in approval device" are listed. Then, one of "Approve addition by selection operation in approval device", "Approve addition by number input operation in approval device", and "Approve addition by button pressing operation in approval device" that are listed can be selected. An example of the approval method when, for example, "Approve addition by selection operation in approval device" is selected is shown in FIG. 8A. The display screen 513 shown in FIG. 7B is shown when "Approve addition by number input operation in approval device" is selected and the number desired by the user can be input on the display screen 513. An example of the approval method when "Approve addition by number input operation in approval device" is selected is shown in FIG. 8B. An example of the approval method when "Approve addition by button pressing operation in approval device" is selected is shown in FIG. 9.

The enter button 506 is a button pressed, after each of the above operations (the input operation and the selection operation) being performed, to confirm content of the operation.

The back button 507 is a button pressed, for example, to return to the display screen displayed immediately before. The enter button 506 and the back button 507 shown in FIGS. 7 and 8 are substantially the same and the same reference numerals are attached in FIGS. 7 and 8 to omit the description thereof.

The display screen 510 shown in FIG. 7A is a display screen displayed when "Specify device manually" is selected in the approval device specifying area 504 shown in FIG. 6 and is a display screen to specify the device that should approve a group addition request. More specifically, the display screen 510 is provided with a device identification information input field 511 and a device name input field 512.

The device desired by the user can be specified by information to identify the device desired by the user being input into at least one of the device identification information input field 511 and the device name input field 512 on the display screen 510.

The display screen 513 shown in FIG. 7B is a display screen displayed when "Approve addition by number input operation in approval device" is selected in the approval method selection area 505 shown in FIG. 6. The number (identification information) desired by the user can be input into a number input field 514 of the display screen 513.

Here, the ID and password of the "group AB" are input into the ID input field 501 of the group and the password input field 502 of the group respectively on the display screen 500 shown in FIG. 6 (604). The ID and password of the "group AB" are examples of group information about the "group AB". "PASOKON KUN" (personal computer) is input into the device name input field 503 and specifying operations desired by the user are performed for the approval device specifying area 504 and the approval method selection area 505 (604). After the input operation and the specifying operation are performed, the enter button 506 is pressed (604).

If the addition operation to the group AB is received as described above (604), a group addition request corresponding to the addition operation is transmitted from the third wireless communication apparatus 410 to the RO 200 (605, 606). Because, as described above, the third wireless communication apparatus 410 is in the connected state (603) with the RO 200, the group addition request is directly transmitted from the third wireless communication apparatus 410 to the RO 200 (605, 606).

The group addition request includes each piece of information input on the display screen 500 and identification information (terminal identification information (PCID#3) recorded in the memory 340) of the device having made the group addition request. Each piece of information input on the display screen 500 is, for example, the ID and password of a group, device name, information (approval device information) about the device that approves a group addition request, and information (approval method information) about the method of approval.

When the group addition request is received by the RO 200 (606), the control unit 210 performs authentication processing of the received group addition request based on content of the group management database 220 (607). More specifically, whether the ID and password included in the received group addition request match the ID and password of a group stored in the group management database 220. If a group whose ID and password match is present, whether the device corresponding to approval device information included in the received group addition request is present in the group is determined.

If "Specify device automatically" is selected in the approval device specifying area 504 shown in FIG. 6, the control unit 210 automatically selects the device that approves a group addition request based on content of the group management database 220. Thus, instead of determining whether the device corresponding to approval device information is present, the device satisfying predetermined conditions of devices belonging the group whose ID and password match is selected as the device that gives approval. The device satisfying predetermined conditions can be defined, for example, as devices having valid MCIM when a group addition request is received. Alternatively, the device may randomly be selected from devices belonging to the group.

If the received group addition request is not authenticated by the authentication processing (607), information indicating that addition to the group related to the group addition request is impossible is transmitted to the third wireless communication apparatus 410 and displayed in the third wireless communication apparatus 410. A case when not authenticated is, for example, a case when the ID and password included in the received group addition request do not match those of the group management database 220. Alternatively, a case when not authenticated is a case when the device corresponding to approval device information included in the received group addition request is not present in the group.

If the received group addition request is authenticated by the authentication processing (607), a group addition approval request is transmitted to the device that should approve the group addition request (608 to 611). In the example shown in FIG. 11, it is assumed that the device corresponding to approval device information included in the received group addition request (or the device automatically selected by the RO 200) is the first wireless communication apparatus 300. In addition, as described above, the first wireless communication apparatus 300 is assumed to be in the connected state (601) with the SHO 150. Thus, the group addition approval request is transmitted from the RO 200 to the first wireless communication apparatus 300 via the SHO 150 (608 to 611). The group addition approval request includes each piece of information (identification information of the device having made the group addition request, the ID and password of the group, the device name, approval device information, and approval method information) included in the group addition request.

When the group addition approval request is received by the first wireless communication apparatus 300 (611), a display screen for group addition approval is displayed in the display unit 370 of the first wireless communication apparatus 300 (612).

FIG. 8 shows examples (the display screens 515, 520) of the display screen to perform an addition approval operation.

FIG. 8A shows the display screen 515 that gives addition approval by a selection operation. More specifically, the display screen 515 is provided with an addition request device display area 516, an addition approval button 517, an addition non-approval button 518, the enter button 506, and the back button 507.

The addition request device display area 516 is an area where information (addition request device information) about the device having made a group addition request is displayed. For example, the device named (when included in the group addition request) and terminal identification information are displayed as addition request device information. The addition request device display area 516 on the display screen 520 shown in FIG. 8B is similar.

The addition approval button 517 is a button pressed when the addition of the device having made a group addition request to the group related to the group addition request is approved.

The addition non-approval button 518 is a button pressed when the addition of the device having made a group addition request to the group related to the group addition request is not approved.

Thus, the addition approval can be given by a pressing operation of a "YES" button (addition approval button 517) or a "NO" button (addition non-approval button 518) on the display screen 515.

FIG. 8B shows the display screen 520 that gives addition approval by a number input operation. More specifically, the display screen 520 is provided with the addition request device display area 516, a number input field 521, the enter button 506, and the back button 507.

The number input field 521 is a display area to input the same number as the number (number input into the number input field 514 shown in FIG. 7B) input into the device having made the group addition request. For example, the number input into the number input field 514 shown in FIG. 7B is included in a group addition approval request. Then, the control unit 330 of the first wireless communication apparatus 300 determines whether the number included in the group addition approval request and the number input into the first wireless communication apparatus 300 match. If, as a result of the determination, these numbers match, the addition to the group related to the group addition approval request is determined to be approved. On the other hand, if these numbers do not match, the addition to the group related to the group addition approval request is determined not to be approved.

In this manner, addition approval can be given by a number input operation on the display screen 520.

Thus, when addition approval is given by a wireless communication apparatus including a user interface (display unit) relatively rich in expressive power, an addition approval operation can be performed by causing the display unit to display the addition approval screen (display screens 515, 520) and using the addition approval screen. However, when addition approval is given by a wireless communication apparatus including only a user interface whose expressive power is limited, a case when the display unit cannot be caused to display the above addition approval screen can also be assumed. Thus, FIG. 9 shows an example in which addition approval is given by a wireless communication apparatus including only a user interface whose expressive power is limited.

In FIG. 9, an example (a light-emitting unit 526, an operation unit 527) of an operation member used when an addition approval operation is performed by a wireless communication apparatus including only a user interface whose expressive power is limited. FIG. 9 shows a speaker 525 as a wireless communication apparatus including only a user interface whose expressive power is limited.

FIG. 9A shows a perspective view on the front side of the speaker 525 and FIG. 9B shows a perspective view on the rear side of the speaker 525. The speaker 525 includes the light-emitting unit 526 and the operation unit 527. The internal configuration about communication of the speaker 525 is assumed to be substantially the same as that of the first wireless communication apparatus 300 shown in FIG. 5. For example, the light-emitting unit 526 corresponds to the display unit 370 and the operation unit 527 corresponds to the operation unit 360.

The light-emitting unit 526 is a light-emitting unit provided on an external surface of the speaker 525 and includes, for example, an LED (Light Emitting Diode). In addition, the light-emitting unit 526 is turned on or turned off based on a control signal from the control unit.

When, for example, the speaker 525 receives a group addition approval request, the user can be notified that an addition approval request is received by a predetermined flashing motion (for example, five times of flashing at fixed intervals) being made by the light-emitting unit 526. In addition, for example, a plurality of LEDs may be included as the light-emitting unit 526 and the user can be notified that a group addition approval request is received by a flashing pattern combining these LEDs.

The operation unit 527 includes one or a plurality of operation members provided on the external surface of the speaker 525. When, for example, the reception of a group addition approval request is notified by the light-emitting unit 526, an addition approval operation can be performed by an operation of a predetermined operation member (for example, five times of continuous pressing operations of a decision button) being performed by the user within a predetermined time. If no operation of the predetermined operation member is performed within the predetermined time after the light-emitting unit 526 notifies that a group addition approval request is received, no addition approval operation is judged to have been performed.

Thus, according to the first embodiment of the present technology, a device having an insufficient UI (user interface) can also perform an approval operation. Therefore, various wireless communication apparatuses can perform an approval operation.

Here, a case in which the display screen 515 shown in FIG. 8A is displayed when a group addition approval request is received by the first wireless communication apparatus 300 (611) is taken as an example. It is assumed that, for example, the addition approval button 517 is pressed on the display screen 515 (612). If the addition approval button 517 is pressed after the device that approves the group addition is checked as described above (612), a group addition approval result is transmitted from the first wireless communication apparatus 300 to the RO 200 (613 to 616). Also in this case, the first wireless communication apparatus 300 is assumed to be in the connected state (601) with the SHO 150 and thus, the group addition approval result is transmitted from the first wireless communication apparatus 300 to the RO 200 via the SHO 150 (613 to 616).

If the group addition approval result indicating that the group addition is approved is received (616), the RO 200 updates content of the group management database 220 (617). That is, in the group management database 220, the third wireless communication apparatus 410 is added to the group AB (updated from the state shown in FIG. 4A to the state shown in FIG. 4B (a dotted line rectangle 227)). If the group addition approval result indicating that the group addition is not approved is received (616), the RO 200 transmits the information to the third wireless communication apparatus 410 without updating content of the group management database 220.

Subsequently, the RO 200 transmits the group addition approval result indicating that the group addition is approved to the third wireless communication apparatus 410 (618, 619). After the group addition approval result indicating that the group addition is approved is received (619), the information is displayed in the display unit 370 of the third wireless communication apparatus 410 (620). A display example thereof is shown in FIG. 10.

Figure 10:
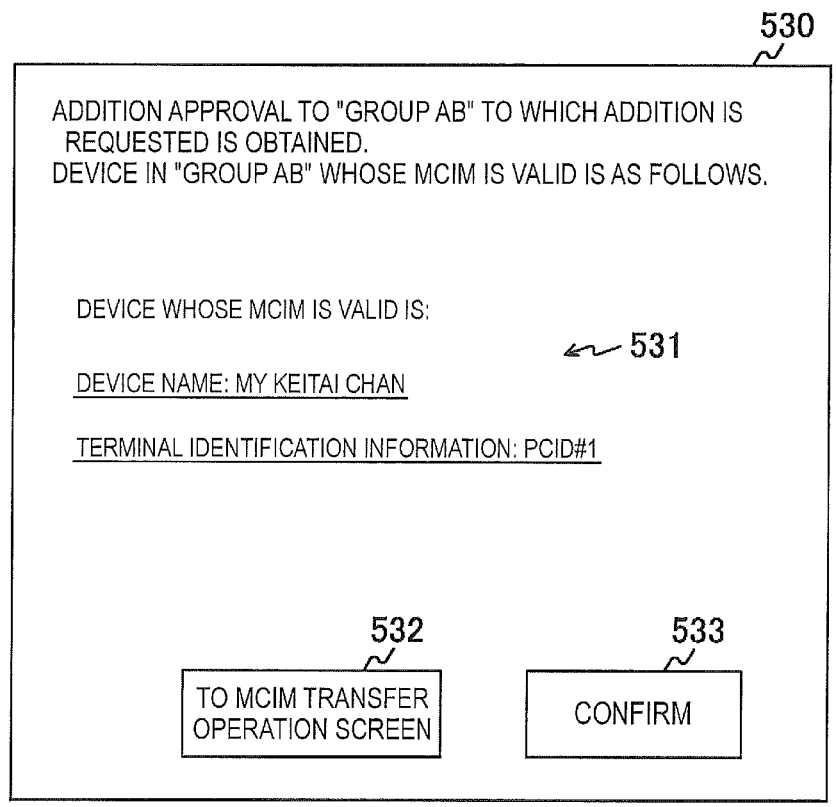
FIG. 10 is a diagram showing a user interface example of each wireless communication apparatus according to the first embodiment of the present technology.

FIG. 10 shows an example of the display screen (a display screen 530) indicating that the group addition is approved. More specifically, the display screen 530 is provided with a display area 531 in which a message indicating that the group addition is approved and further, devices whose MCIM are valid are displayed, a button to MCIM transfer operation screen 532, and a confirm button 533.

The display area 531 of devices whose MCIM is valid is an area where information (device information) about devices whose MCIM is valid of devices belonging to the group to which the addition is approved. For example, content of the group management database 220 is included in the group addition approval result and device information is displayed based on the content.

The button to MCIM transfer operation screen 532 is a button pressed to make a transition to the display screen on which an operation to transfer MCIM between devices belonging to the group to which the addition is approved is performed.

The confirm button 533 is a button pressed by the user after confirming that the group addition is approved and devices whose MCIM is valid. When the confirm button 533 is pressed, a predetermined display screen (for example, the initial screen) is displayed.

Thus, the third wireless communication apparatus 410 can be added to the group AB by performing an addition operation in the third wireless communication apparatus 410. In this case, the third wireless communication apparatus 410 is added to the group AB after the addition approval by another device belonging to the group AB is gained and thus, an unintended device can be prevented from being added to the group AB. For example, even if the group ID or group password of the group AB is leaked to a third party, a device of the third party can be prevented from being added to the group AB.

[Communication Example when Addition Approval is Sought from a Device Holding No Valid MCIM]

Figure 12:
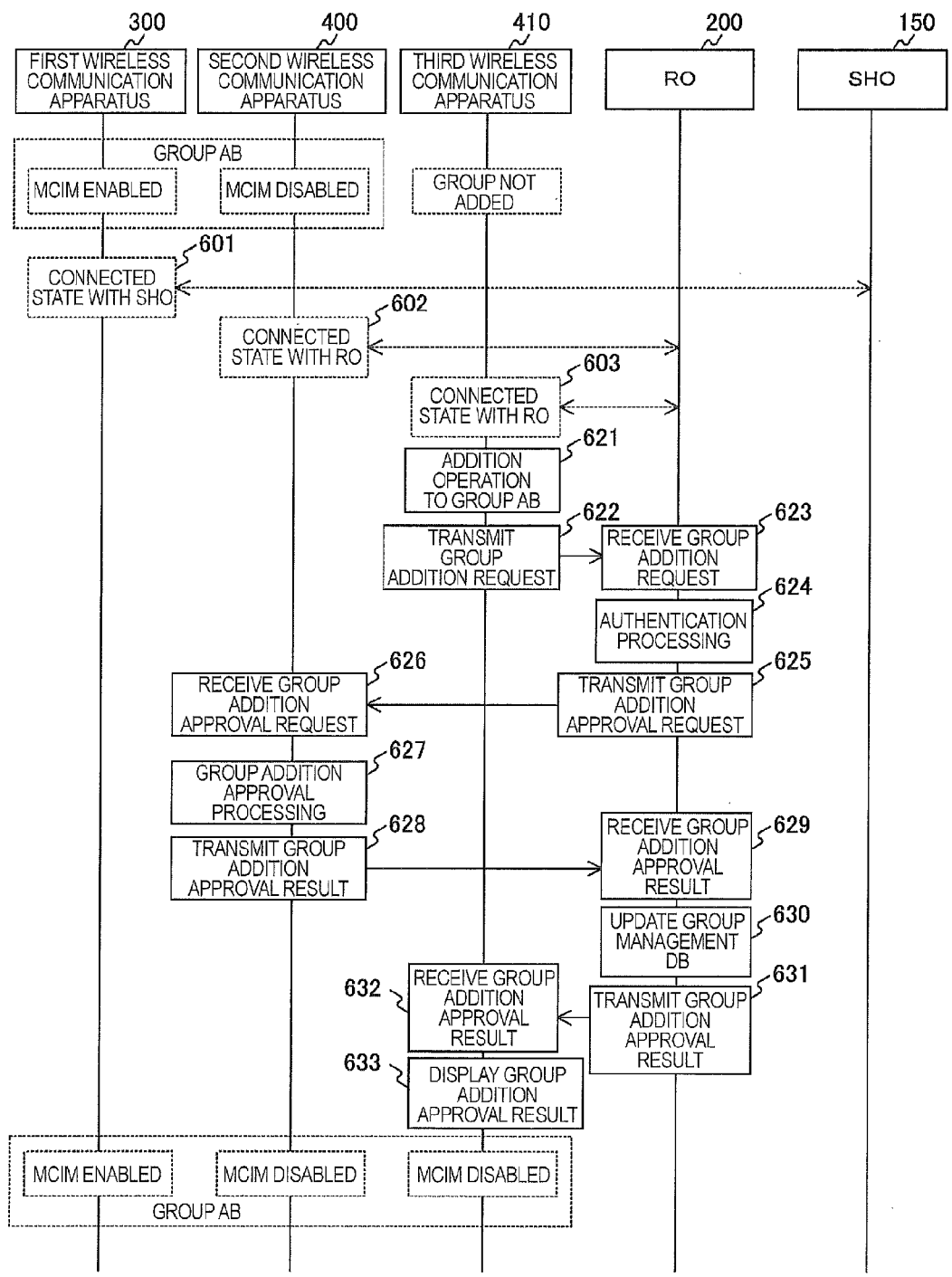
FIG. 12 is a sequence chart showing a communication processing example between each apparatus included in the communication system 100 according to the first embodiment of the present technology.

FIG. 12 is a sequence chart showing a communication processing example between each apparatus included in the communication system 100 according to the first embodiment of the present technology. The sequence chart shown in FIG. 12 is a modification of FIG. 11 and thus, the same reference numerals are attached to units common to FIG. 11 and a portion of description thereof is omitted. In FIG. 12, an example in which group addition approval is requested from the second wireless communication apparatus 400 holding no valid MCIM is described. The second wireless communication apparatus 400 holding no valid MCIM can establish only a limited connection to the RO 200 based on PCID. Thus, in the example shown in FIG. 12, a group addition approval request is directly transmitted from the RO 200 to the second wireless communication apparatus 400 and a group addition approval result is directly transmitted from the second wireless communication apparatus 400 to the RO 200.

Each piece of processing (621 to 624) shown in FIG. 12 corresponds to each piece of processing (604 to 607) shown in FIG. 11. However, the processing shown in FIG. 12 is different in that, as an addition operation to the group AB, an operation to request the group addition approval from the second wireless communication apparatus 400 is performed.

In addition, each piece of processing (625 to 630) shown in FIG. 12 corresponds to each piece of processing (608 to 617) shown in FIG. 11. However, as described above, the second wireless communication apparatus 400 is assumed to be in the connected state (602) with the RO 200 and thus, the processing shown in FIG. 12 is different in that a group addition approval request is directly transmitted from the RO 200 to the second wireless communication apparatus 400 without going through the SHO 150 (625, 626). The processing shown in FIG. 12 is also different in that a group addition approval result is similarly transmitted directly from the second wireless communication apparatus 400 to the RO 200 without going through the SHO 150 (628, 629).

In addition, each piece of processing (631 to 633) shown in FIG. 12 corresponds to each piece of processing (618 to 620) shown in FIG. 11.

[Operation Example of the Communication System]

Next, the operation of the communication system 100 according to the first embodiment of the present technology will be described with reference to drawings. Incidentally, only an operation example of the third wireless communication apparatus 410 is shown in FIGS. 13 and 14, but the first embodiment can similarly applied to the operation of other wireless communication apparatuses.

[Operation Example of the Wireless Communication Apparatus (Transmission Source of a Group Addition Request)]

Figure 13:
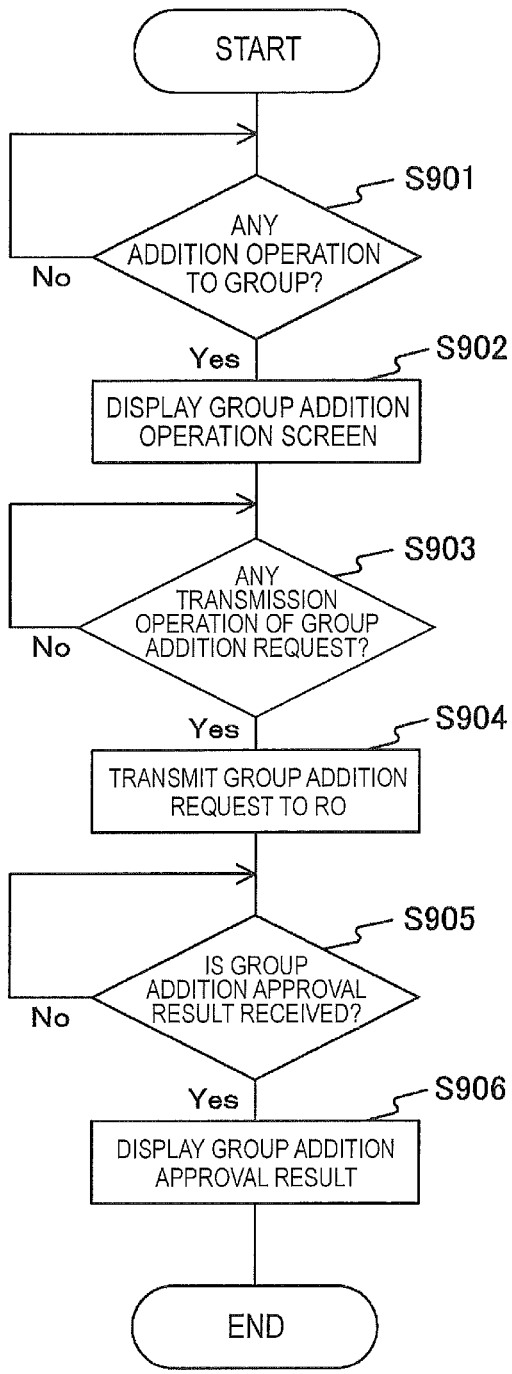
FIG. 13 is a flow chart showing an example of a processing procedure for communication processing by a third wireless communication apparatus 410 according to the first embodiment of the present technology.
Figure 14:
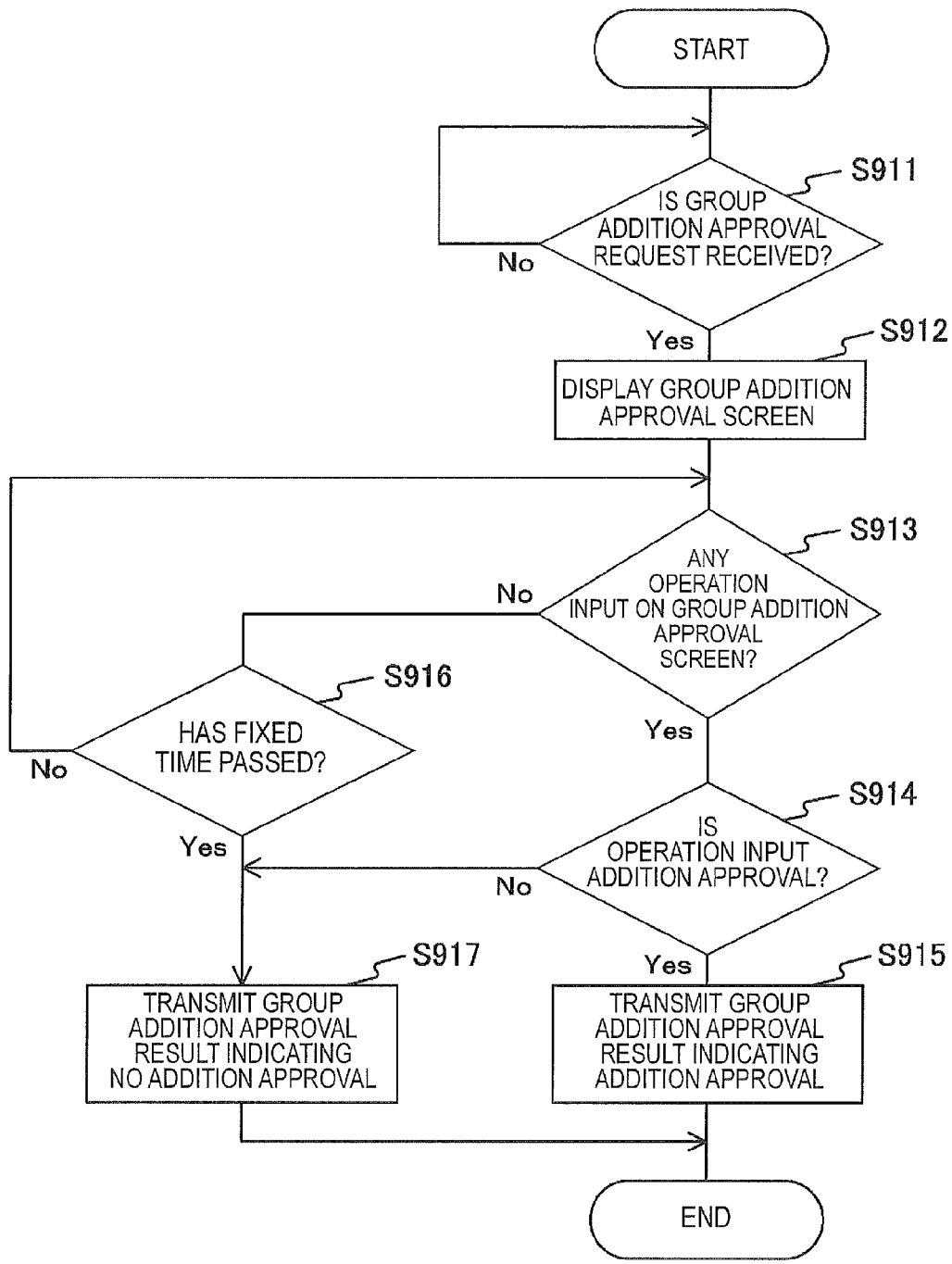
FIG. 14 is a flow chart showing an example of the processing procedure for communication processing by the first wireless communication apparatus 300 according to the first embodiment of the present technology.

FIG. 13 is a flow chart showing an example of a processing procedure for communication processing by the third wireless communication apparatus 410 according to the first embodiment of the present technology. In FIG. 13, a case when the third wireless communication apparatus 410 makes a group addition request is taken as an example.

First, the control unit 330 determines whether an addition operation to a group sharing MCIM is performed (step S901) and, if no addition operation is performed, continues to monitor.

If an addition operation is performed (step S901), the control unit 330 causes the display unit 370 to display a display screen (group addition operation screen (for example, the display screen 500 shown in FIG. 6)) to perform an addition operation to a group sharing MCIM (step S902). Subsequently, the control unit 330 determines whether a transmission operation (for example, a pressing operation of the enter button 506 after operations of necessary items on the display screen 500 shown in FIG. 6) of a group addition request is performed on the display screen (step S903). If no transmission operation is performed (step S903), the control unit 330 continues to monitor.

Subsequently, if a transmission operation (addition operation) of a group addition request is performed (step S903), the control unit 330 transmits a group addition request corresponding to the addition operation to the RO 200 (step S904). Incidentally, step S903 is an example of a reception procedure described in claims. In addition, step S904 is an example of a transmission procedure described in claims.

Subsequently, whether a group addition approval result indicating that the group addition is approved is determined (step S905) and if no group addition approval result is received, monitoring is continued. On the other hand, if a group addition approval result is received (step S905), the control unit 330 causes the display unit 370 to display information (for example, the display screen 530 shown in FIG. 10) that the group addition is approved (step S906).

If information indicating that no addition is allowed to the group related to the group addition request is received, the control unit 330 causes the display unit 370 to display the information.

[Operation Example of the Wireless Communication Apparatus (Transmission Destination of a Group Addition Approval Request)]

FIG. 14 is a flow chart showing an example of the processing procedure for communication processing by the first wireless communication apparatus 300 according to the first embodiment of the present technology. In FIG. 14, a case in which the first wireless communication apparatus 300 receives a group addition approval request is taken as an example.

First, the control unit 330 determines whether a group addition approval request is received (step S911) and, if no group addition approval request is received, continues to monitor.

If a group addition approval request is received (step S911), the control unit 330 causes the display unit 370 to display a display screen (group addition approval screen (for example, the display screen 515 or 520 shown in FIG. 8)) to approve the group addition (step S912). The group addition approval screen is displayed in accordance with the approval method selected by the device that has made the group addition request.

Subsequently, the control unit 330 determines whether operation input is received on the group addition approval screen (step S913). If an operation input is received on the group addition approval screen (step S913), the control unit 330 determines whether the operation input is an operation input indicating that the addition is approved (step S914).

If the operation input indicating that the addition is approved (step S914), the control unit 330 transmits a group addition approval result indicating that the addition is approved to the RO 200 via the SHO 150 (step S915). On the other hand, if the operation input indicating that the addition is not approved (step S914), the control unit 330 transmits a group addition approval result indicating that the addition is not approved to the RO 200 via the SHO 150 (step S917). Incidentally, when a wireless communication apparatus holding no valid MCIM is used, a group addition approval result is directly transmitted to the RO 200 (steps S915, S917).

If no operation input is received on the group addition approval screen (step S913), the control unit 330 determines whether a fixed time has passed after the group addition approval screen is displayed (step S916). If the fixed time has not passed after the group addition approval screen is displayed (step S916), the processing returns to step S913 and if the fixed time has passed after the group addition approval screen is displayed (step S916), the processing proceeds to step S917. That is, if no approval is obtained within the fixed time, the control unit 330 transmits a group addition approval result indicating that the addition is not approved to the RO 200 via the SHO 150 (step S917). Incidentally, when a wireless communication apparatus holding no valid MCIM is used, a group addition approval result is directly transmitted to the RO 200.

[Operation Example of the Information Processing Apparatus (RO)]

Figure 15:
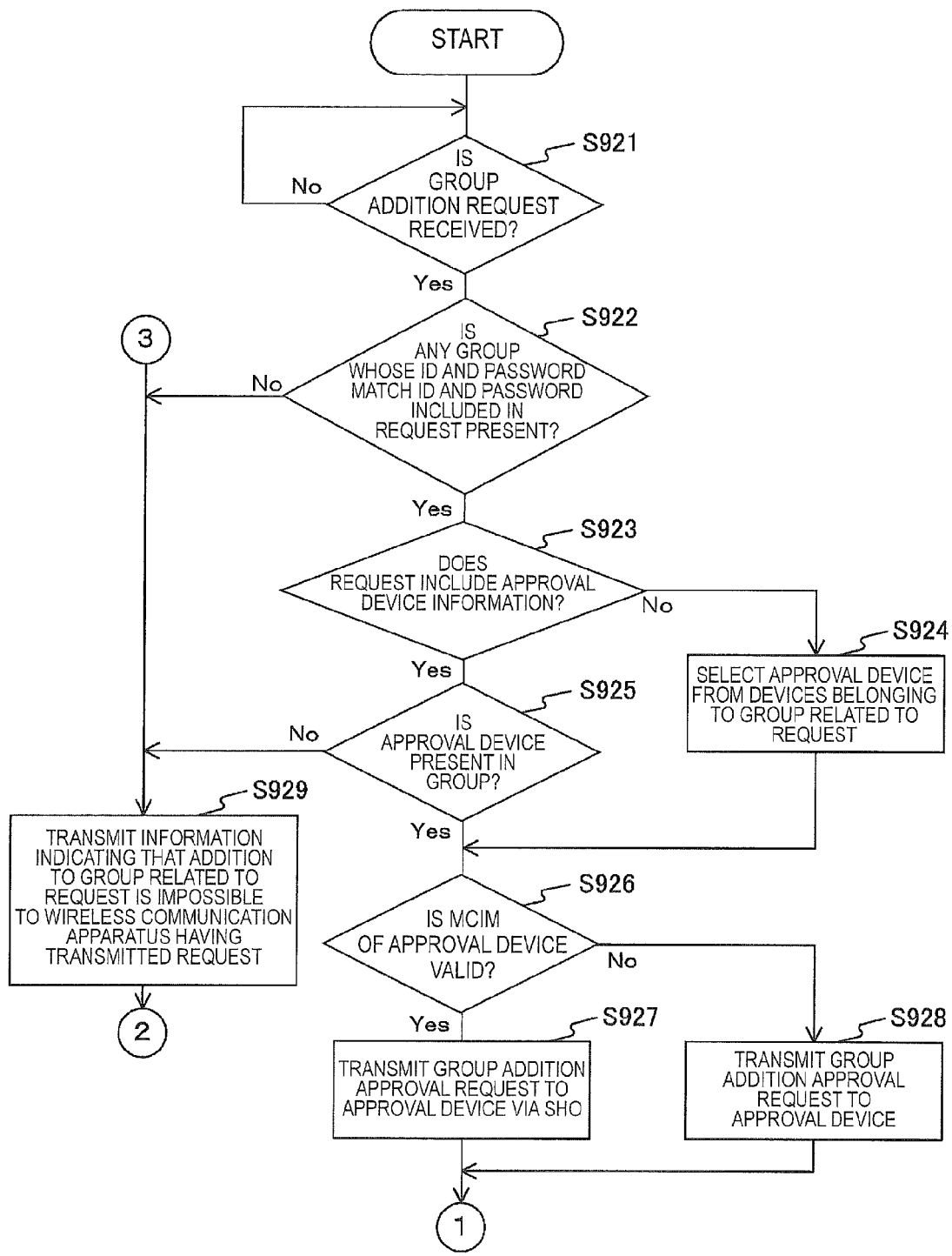
FIG. 15 is a flow chart showing an example of the processing procedure for communication processing by an information processing apparatus (RO) 200 according to the first embodiment of the present technology.
Figure 16:
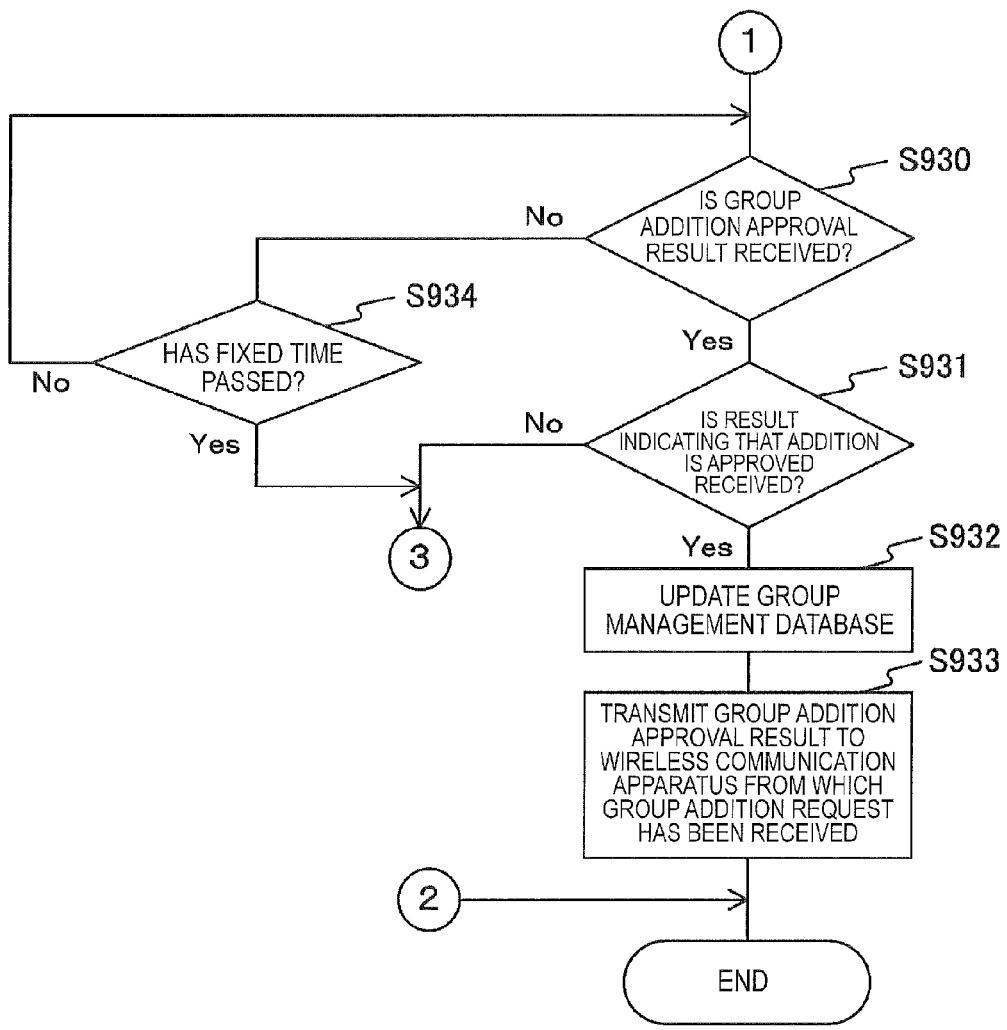
FIG. 16 is a flow chart showing an example of the processing procedure for communication processing by the information processing apparatus (RO) 200 according to the first embodiment of the present technology.

FIGS. 15 and 16 are a flow chart showing an example of the processing procedure for communication processing by the information processing apparatus (RO) 200 according to the first embodiment of the present technology.

First, the control unit 210 determines whether a group addition request is received (step S921) and, if no group addition request is received, continues to monitor.

When a group addition request is received (step S921), the control unit 210 performs authentication processing of the received group addition request based on content of the group management database 220 (steps S922 to S925). More specifically, whether the ID and password included in the received group addition request match the ID and password of a group stored in the group management database 220 (step S922). That is, whether a group whose ID and password match those included in the received group addition request is present is determined (step S922). If no group whose ID and password match those included in the received group addition request is present (step S922), the control unit 210 transmits information indicating that the addition to the group related to the group addition request is not allowed to the wireless communication apparatus having transmitted the group addition request (step S929). In this case, information indicating that the addition to the group related to the group addition request is not allowed is transmitted to the wireless communication apparatus having transmitted the group addition request.

If a group whose ID and password match those included in the received group addition request is present (step S922), the control unit 210 determines whether the received group addition request includes approval device information (step S923). If no approval device information is included in the received group addition request (step S923), the control unit 210 selects one device (approval device) from devices belonging to the group related to the received group addition request (step S924). If, for example, "Specify device automatically" is selected in the approval device specifying area 504 shown in FIG. 6, no approval device information is included in the group addition request.

If approval device information is included in the group addition request (step S923), the control unit 210 determines whether the device (approval device) related to the approval device information is present in the group related to the received group addition request (step S925). If the approval device is not present in the group related to the received group addition request (step S925), the processing proceeds to step S929.

If the approval device is present in the group related to the received group addition request (step S925), the control unit 210 determines whether the approval device is a device holding valid MCIM (step S926). For example, whether the approval device holds valid MCIM is determined based on the valid/invalid information 226 of the group management database 220 (shown in FIG. 4).

If the approval device is a device holding valid MCIM (step S926), the control unit 210 transmits a group addition approval request to the approval device via the SHO 150 (step S927). On the other hand, if the approval device is a device holding no valid MCIM (step S926), the control unit 210 directly transmits a group addition approval request to the approval device without going through the SHO 150 (step S928).

Subsequently, the control unit 210 determines whether a group addition approval result is received (step S930) and, if no group addition approval result is received, determines whether a fixed time has passed after transmitting the group addition approval request (step S934). If the fixed time has not passed after the transmission of the group addition approval request (step S934), the processing returns to step S930 and if the fixed time has passed after the transmission of the group addition approval request (step S934), the processing returns to step S929.

If a group addition approval result is received (step S930), the control unit 210 determines whether the received group addition approval result is a group addition approval result indicating that the addition is approved (step S931). If the received group addition approval result is not a group addition approval result indicating that the addition is approved (that is, a group addition approval result indicating that the addition is not approved) (step S931), the processing returns to step S929.

If the received group addition approval result is a group addition approval result indicating that the addition is approved (step S931), the control unit 210 updates content of the group management database 220 (step S932). Subsequently, the control unit 210 transmits the group addition approval result indicating that the addition is approved to the wireless communication apparatus having transmitted the group addition request (step S933).

[Deletion Example from a Group]

Figure 22:
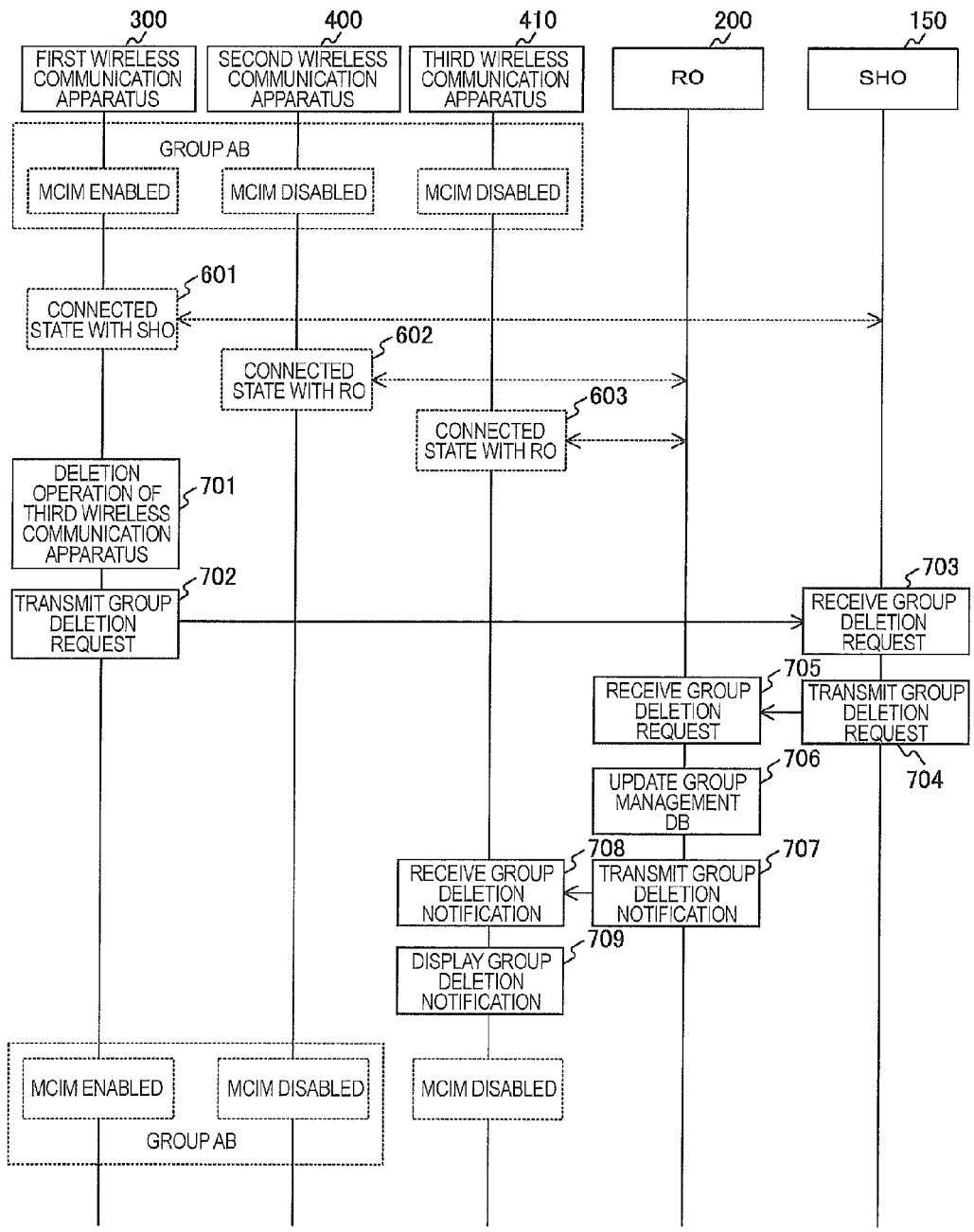
FIG. 22 is a sequence chart showing a communication processing example between each apparatus included in the communication system 100 according to the first embodiment of the present technology.

In the foregoing, a case in which a new device is added and registered with a group sharing MCIM has been taken as an example. Hereinafter, a case in which a device is deleted from a group sharing MCIM is taken as an example. As a case in which a device is deleted from a group sharing MCIM, mainly (A) to (D) shown below can be assumed:

(A) When MCIM of the device to be operated to delete is valid and the device is deleted from a group (B) When MCIM of the device to be operated to delete is valid and a device other than the device is deleted from a group (shown in FIG. 22)

Figure 23:
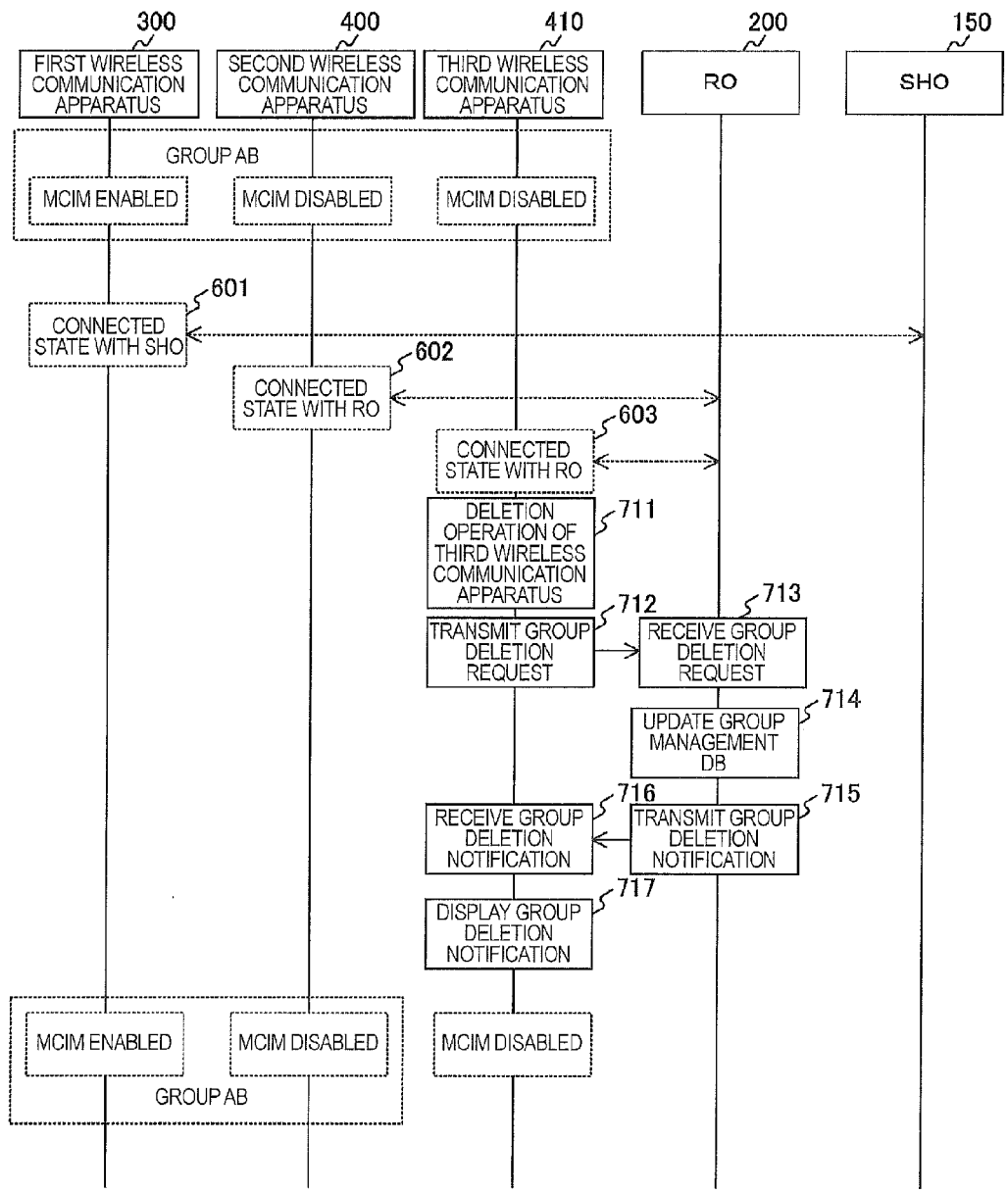
FIG. 23 is a sequence chart showing a communication processing example between each apparatus included in the communication system 100 according to the first embodiment of the present technology.

(C) When MCIM of the device to be operated to delete is invalid and the device is deleted from a group (shown in FIG. 23)

Figure 19:
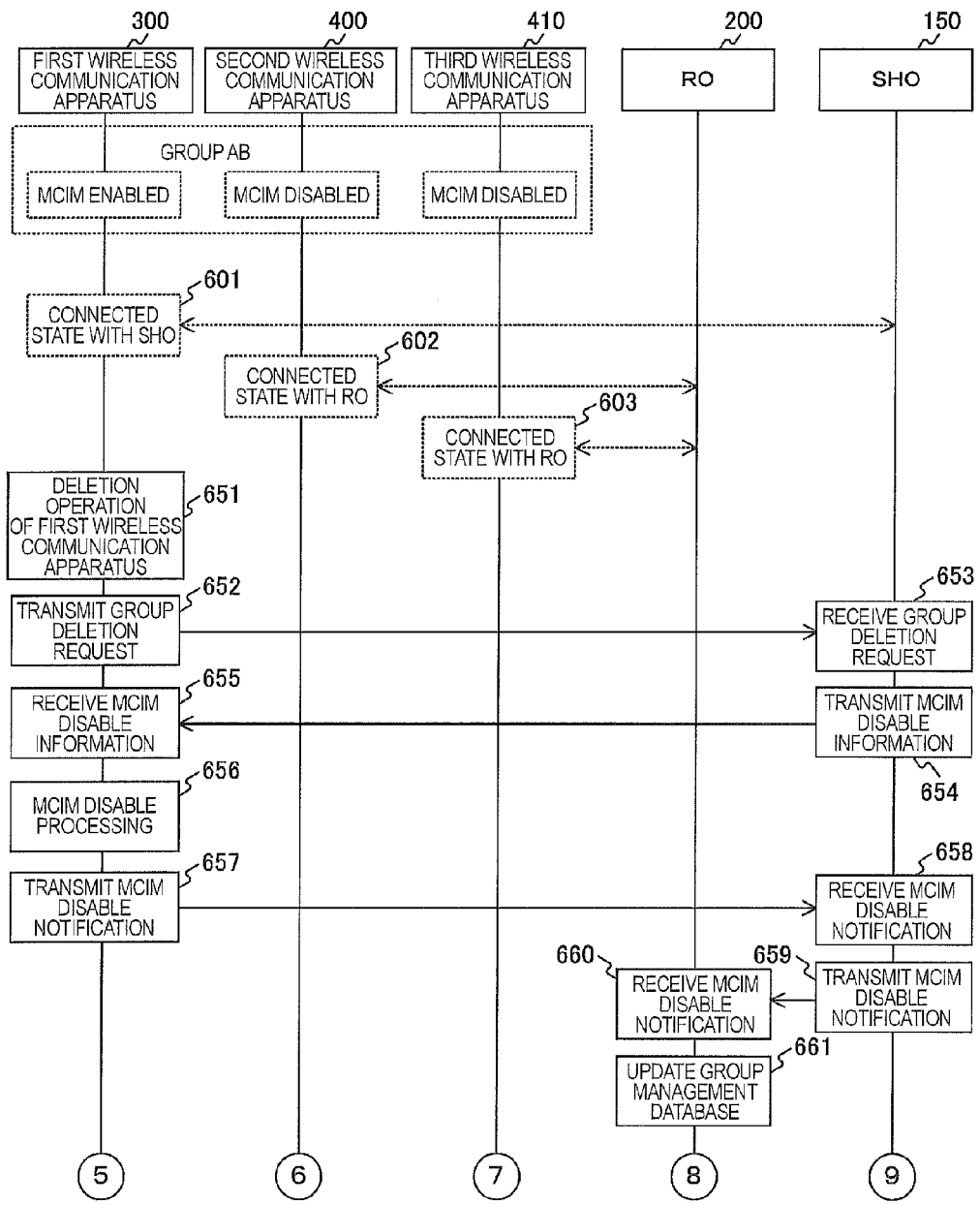
FIG. 19 is a sequence chart showing a communication processing example between each apparatus included in the communication system 100 according to the first embodiment of the present technology.
Figure 20:
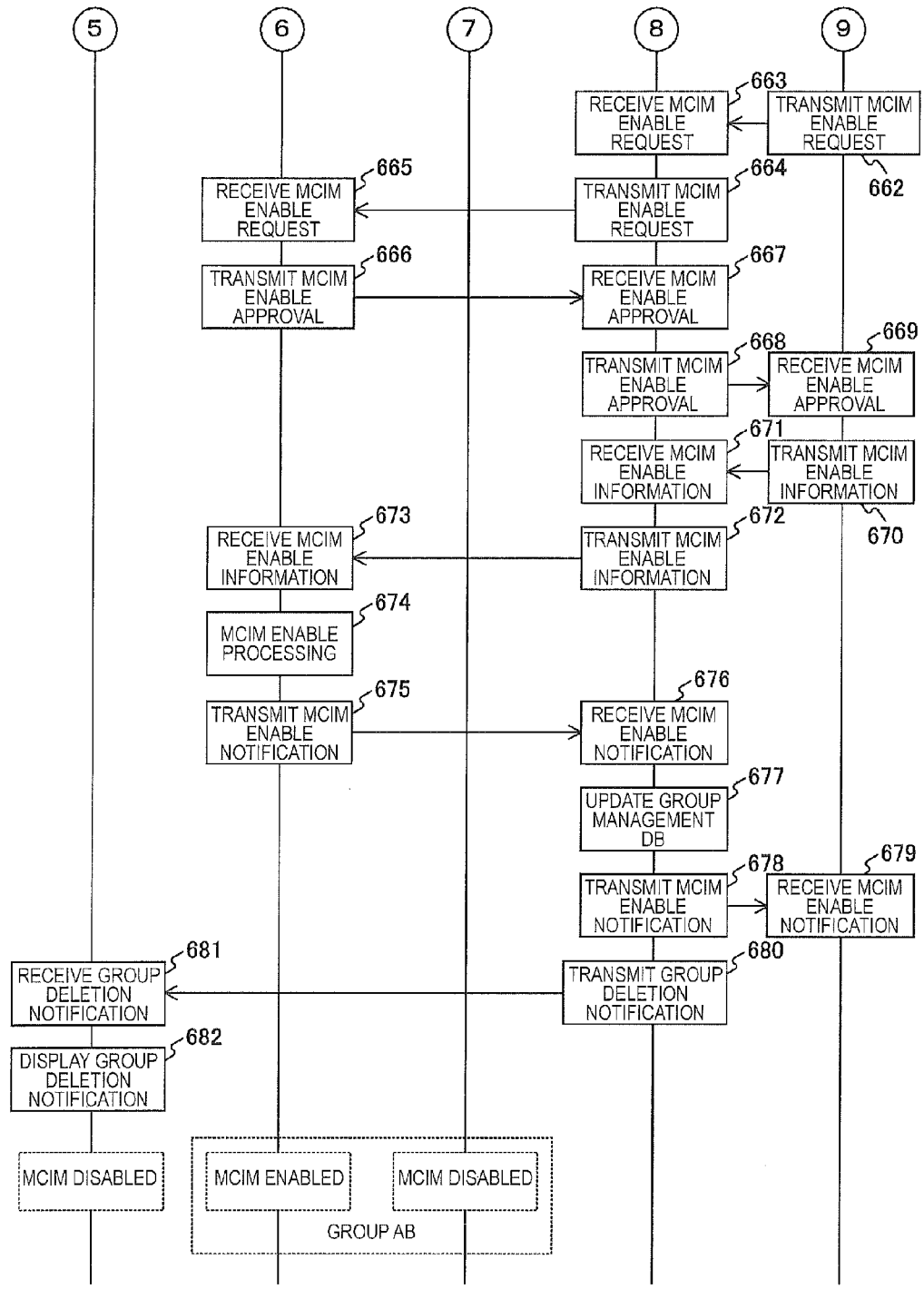
FIG. 20 is a sequence chart showing the communication processing example between each apparatus included in the communication system 100 according to the first embodiment of the present technology.

(D) When MCIM of the device to be operated to delete is invalid and a device other than the device is deleted from a group Regarding (A), handling of MCIM after deleting the device from a group can be classified into the following two cases:

(A-1) MCIM is made to be transferred to another device remaining in the group (shown in FIGS. 19 and 20)

Figure 21:
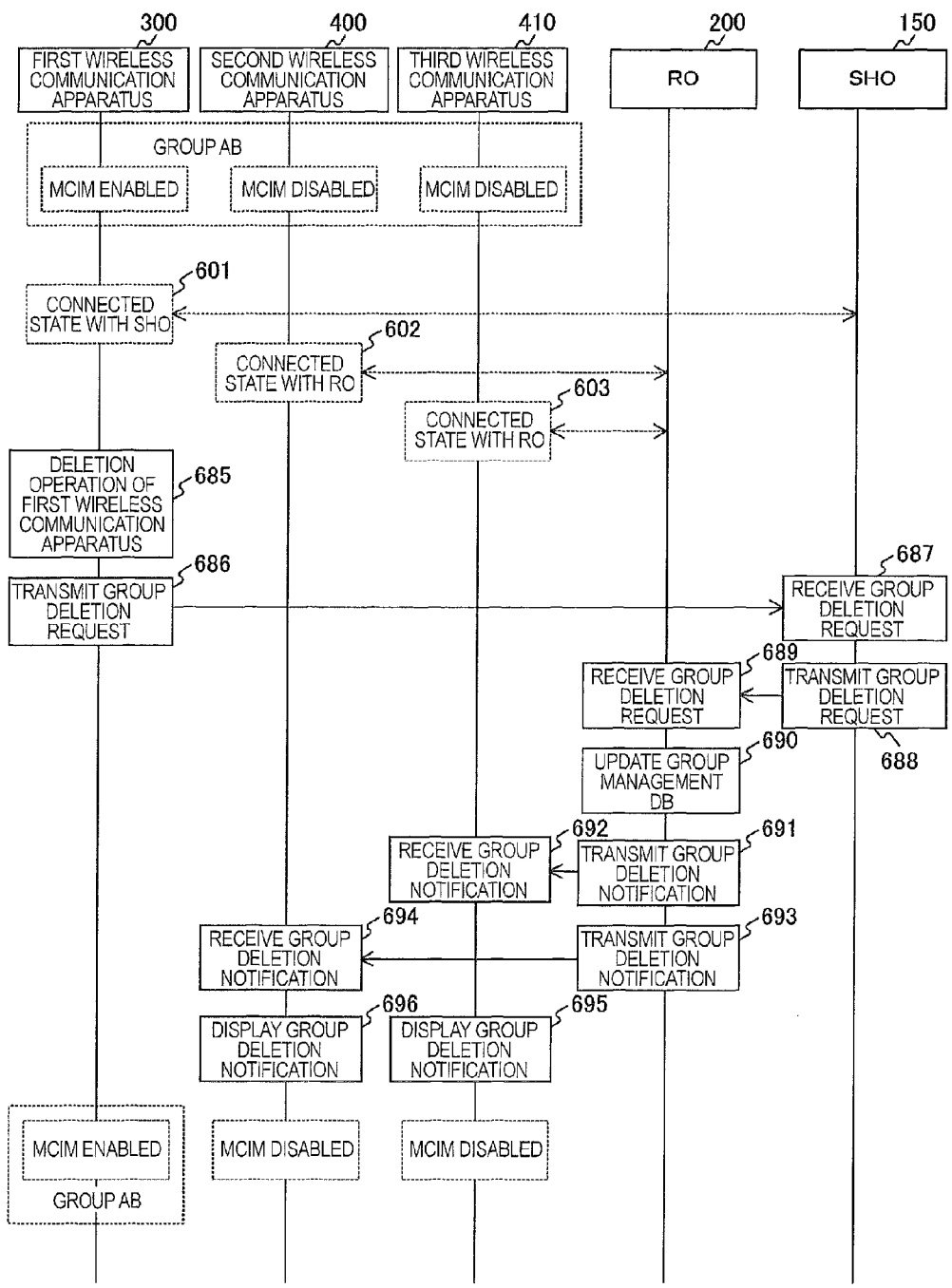
FIG. 21 is a sequence chart showing a communication processing example between each apparatus included in the communication system 100 according to the first embodiment of the present technology.

(A-2) The device is moved away from the group while holding MCIM (shown in FIG. 21)

(D) can be classified into the following two cases in accordance with whether the device to be deleted holds valid MCIM:

(D-1) When MCIM of the device to be deleted is invalid (shown in FIG. 24)

(D-2) When MCIM of the device to be deleted is valid (shown in FIGS. 25 and 26)

[Communication Example (A-1) Between Each Apparatus]

FIGS. 17 and 18 are diagrams showing display screen examples displayed in each wireless communication apparatus according to the first embodiment of the present technology. These display screens will be described in detail with reference to the sequence chart shown in FIGS. 19 and 20.

FIGS. 19 and 20 are a sequence chart showing a communication processing example between each apparatus included in the communication system 100 according to the first embodiment of the present technology.

In FIGS. 19 and 20, communication processing when the first wireless communication apparatus 300 is deleted from the "group AB" by operating the first wireless communication apparatus 300 is taken as an example. That is, in FIGS. 19 and 20, a sequence chart corresponding to (A-1) described above is shown. In FIGS. 19 to 26, a case in which the first wireless communication apparatus 300 holds valid MCIM when the "group AB" includes the first wireless communication apparatus 300, the second wireless communication apparatus 400, and the third wireless communication apparatus 410 is assumed. Also in FIGS. 19 to 26, like in FIG. 11, it is assumed that the first wireless communication apparatus 300 is in the connected state (601) with the SHO 150 and the second wireless communication apparatus 400 and the third wireless communication apparatus 410 are in the connected states (602, 603) with the RO 200.

First, the display screen to delete the desired wireless communication apparatus from the "group AB" is displayed in the display unit 370 of the first wireless communication apparatus 300.

FIG. 17 shows examples (display screens 550, 555) of the display screen to perform a deletion operation. FIG. 17A shows the display screen 550 to select the device to be deleted. More specifically, the display screen 550 is provided with a selection area of device to be deleted 551, the enter button 506, and the back button 507.

The selection area of device to be deleted 551 is an area to select the device to be deleted from devices belonging to the "group AB". If, for example, the pull-down button (▼) is pressed, device information (for example, the device name or terminal identification information) about devices belonging to the "group AB" is listed. Then, the device to be deleted is selected by the user from the listed devices.

Information (device information) about devices listed in the selection area of device to be deleted 551 is stored in the group management database 220 of the RO 200. Thus, device information stored in the group management database 220 is transmitted to each wireless communication apparatus at regular or irregular intervals from the control unit 210 of the RO 200 so as to be stored in the memory 340 of each wireless communication apparatus. Alternatively, each time an instruction operation to cause a display screen to perform a deletion operation to be displayed is performed, device information thereof may be acquired by successively requesting from the RO 200.

FIG. 17B shows the display screen 555 displayed after a device holding valid MCIM being selected on the display screen 550 shown in FIG. 17A. More specifically, the display screen 555 is provided with an MCIM handling selection area 556, the enter button 506, and the back button 507.

The MCIM handling selection area 556 is an area where, after a device holding valid MCIM is selected on the display screen 550, handling of the valid MCIM is selected. If, for example, the pull-down button (▼) is pressed, information about handling of the valid MCIM is listed.

If the enter button 506 is pressed after a selection operation of the first wireless communication apparatus 300 in the selection area of device to be deleted 551 of the display screen 550 shown in FIG. 17A, the display screen 555 shown in FIG. 17B is displayed. Subsequently, it is assumed that the enter button 506 is pressed after a selection operation of "Pass MCIM to another device remaining in group" in the MCIM handling selection area 556 of the display screen 555 (651).

If the deletion operation from the group AB is received as described above (651), a group deletion request corresponding to the deletion operation is transmitted from the first wireless communication apparatus 300 to the SHO 150 (652, 653). Because, as described above, the first wireless communication apparatus 300 is assumed to be in the connected state (601) with the SHO 150, the group deletion request is directly transmitted from the first wireless communication apparatus 300 to the SHO 150.

The group deletion request includes information (deletion request device information) about the device having made a group deletion request and information (deletion target device information) about the device to be deleted. In this example, information (valid MCIM holding device information) about the device holding valid MCIM after deletion in accordance with the group deletion request is included in the group deletion request.

Subsequently, when the group deletion request is received (653), the SHO 150 determines handling of MCIM of the first wireless communication apparatus 300 based on valid MCIM holding device information included in the group deletion request. In the example shown in FIGS. 19 and 20, "Pass MCIM to another device remaining in group" is selected in the MCIM handling selection area 556 of the display screen 555. Thus, processing to disable MCIM in the first wireless communication apparatus 300 is performed (654 to 661). That is, the SHO 150 transmits MCIM disable information to disable MCIM of the first wireless communication apparatus 300 to the first wireless communication apparatus 300 (654, 655).

After the first wireless communication apparatus 300 receives the MCIM disable information (655), disable processing of MCIM stored in an MCIM information storage unit 350 of the first wireless communication apparatus 300 is performed (656). Accordingly, the MCIM held by the first wireless communication apparatus 300 is disabled and the first wireless communication apparatus 300 can no longer connect to the SHO 150 based on MCIM.

After the disable processing of MCIM is completed (656), an MCIM disable notification indicating that the disable processing of MCIM is completed is transmitted from the first wireless communication apparatus 300 to the RO 200 via the SHO 150 (657 to 660). After the RO 200 receives the MCIM disable notification (660), the control unit 210 rewrites content of the group management database 220 (661). That is, content (the valid/invalid information 226 shown in FIG. 4) of the group management database 220 is rewritten so that the first wireless communication apparatus 300 is disabled (661).

Subsequently, an MCIM enable request to enable MCIM of a wireless communication apparatus other than the first wireless communication apparatus 300 of wireless communication apparatuses belonging to the group AB is transmitted from the SHO 150 to the RO 200 (662, 663). When the MCIM enable request is received (663), the control unit 210 identifies a wireless communication apparatus other than the first wireless communication apparatus 300 as a device holding valid MCIM based on content of the group management database 220. That is, in the example shown in FIGS. 19 and 20, "Pass MCIM to another device remaining in group" is selected in the MCIM handling selection area 556 of the display screen 555. Thus, a wireless communication apparatus other than the first wireless communication apparatus 300 is identified as a device holding valid MCIM after deletion. For example, after a selection operation of "Pass MCIM to another device remaining in group" in the MCIM handling selection area 556 of the display screen 555, a device may be selected by a user operation to include information about the selected device in a group deletion request. When no device is selected by a user operation, one of wireless communication apparatuses belonging to the group AB may automatically be selected by the control unit 210 (for example, in the order of registration). In this example, a case when the second wireless communication apparatus 400 is selected as a device holding valid MCIM is taken as an example.

That is, an MCIM enable request to enable MCIM of the second wireless communication apparatus 400 is transmitted from the RO 200 to the second wireless communication apparatus 400 (664, 665). When the MCIM enable request is received (665), MCIM enable approval that gives approval to enabling of MCIM is transmitted from the second wireless communication apparatus 400 to the SHO 150 via the RO 200 (666 to 669).

When the MCIM enable approval is received (669), enable processing of MCIM in the second wireless communication apparatus 400 is performed (670 to 679). That is, the SHO 150 transmits MCIM enable information to enable MCIM of the second wireless communication apparatus 400 to the second wireless communication apparatus 400 via the RO 200 (670 to 673).

When the second wireless communication apparatus 400 receives the MCIM enable information (673), enable processing of MCIM in the MCIM information storage unit 350 of the second wireless communication apparatus 400 is performed (674). MCIM in the second wireless communication apparatus 400 is thereby enabled so that the second wireless communication apparatus 400 can connect to the SHO 150 based on MCIM.

After the enable processing of MCIM is completed (674), an MCIM enable notification indicating that the enable processing of MCIM is completed is transmitted from the second wireless communication apparatus 400 to the RO 200 (675, 676). After the RO 200 receives the MCIM enable notification (676), the control unit 210 rewrites content of the group management database 220 (677). That is, content (the valid/invalid information 226 shown in FIG. 4) of the group management database 220 is rewritten so that the second wireless communication apparatus 400 is enabled (677).

After the group management database 220 is rewritten, an MCIM enable notification is transmitted from the RO 200 to the SHO 150 (678, 679). In addition, a group deletion completion notification indicating that deletion processing in accordance with the group deletion request is completed is transmitted from the RO 200 to the first wireless communication apparatus 300 (680, 681). Because MCIM in the first wireless communication apparatus 300 is disabled, the group deletion completion notification is directly transmitted from the RO 200 to the first wireless communication apparatus 300 (680, 681).

When the group deletion completion notification is received (681), the control unit 330 of the first wireless communication apparatus 300 causes the display unit 370 to display the group deletion completion notification (682). A display example thereof is shown in FIG. 18.

FIG. 18 shows an example (display screen 560) of the display screen that displays a group deletion completion notification. More specifically, a message to notify that group deletion is completed is displayed in the display screen 560 and a confirm button 561 is provided. If the user presses the confirm button 561 after confirming the message on the display screen 560, another screen is displayed. This completes a sequence of the group deletion processing in the first wireless communication apparatus 300.

A procedure defined in 3GPP can be applied as the procedure (MCIM De-activate (654 to 658)) for disabling valid MCIM from a network side. More specifically, the procedure (HLR-initiated detach procedure) defined in Non-Patent Literature (3GPP TR 23.060) can be applied.

In addition, a procedure defined in 3GPP can be applied as the procedure (MCIM Provisioning and download (662 to 679)) for downloading to a device and enabling MCIM from a network side. More specifically, the procedure (Remote Provisioning) defined in Non-Patent Literature 1 can be applied.

[Communication Example (A-2) Between Each Apparatus]

FIG. 21 is a sequence chart showing a communication processing example between each apparatus included in the communication system 100 according to the first embodiment of the present technology.

In FIG. 21, communication processing in a case when the second wireless communication apparatus 400 and the third wireless communication apparatus 410 are deleted from the "group AB" by operating the first wireless communication apparatus 300 is taken as an example. That is, in FIG. 21, a sequence chart corresponding to (A-2) described above is shown.

First, the display screen to delete the desired wireless communication apparatuses from the "group AB" is displayed in the display unit 370 of the first wireless communication apparatus 300.

If the enter button 506 is pressed after a selection operation of the first wireless communication apparatus 300 in the selection area of device to be deleted 551 of the display screen 550 shown in FIG. 17A, the display screen 555 shown in FIG. 17B is displayed. Subsequently, it is assumed that the enter button 506 is pressed after a selection operation of "Move away from group with MCIM" in the MCIM handling selection area 556 of the display screen 555 (685).

If the deletion operation from the group AB is received as described above (685), a group deletion request corresponding to the deletion operation is transmitted from the first wireless communication apparatus 300 to the SHO 150 (686, 687).

Subsequently, when the group deletion request is received (687), the SHO 150 determines handling of MCIM of the first wireless communication apparatus 300 based on valid MCIM holding device information included in the group deletion request. In the example shown in FIG. 21, "Move away from group with MCIM" is selected in the MCIM handling selection area 556 of the display screen 555. Thus, MCIM in the first wireless communication apparatus 300 maintains a valid state. In addition, other wireless communication apparatuses (the second wireless communication apparatus 400 and the third wireless communication apparatus 410) belonging to the group AB are deleted from the group AB. Thus, the SHO 150 transmits a group deletion request thereof to the RO 200 (688, 689).

After the RO 200 receives the group deletion request (689), the control unit 210 rewrites content of the group management database 220 (690). That is, content of the group management database 220 is rewritten so that other wireless communication apparatuses (the second wireless communication apparatus 400 and the third wireless communication apparatus 410) belonging to the group AB are deleted (690).

After the group management database 220 is rewritten (690), a group deletion notification is transmitted from the RO 200 to other wireless communication apparatuses (the second wireless communication apparatus 400 and the third wireless communication apparatus 410) belonging to the group AB (691 to 694).

When the group deletion notification is received (692, 694), the control unit 330 of each of the other wireless communication apparatuses (the second wireless communication apparatus 400 and the third wireless communication apparatus 410) causes the display unit 370 to display the group deletion notification (695, 696). A display example thereof is shown in FIG. 18.

[Communication Example (B) Between Each Apparatus]

FIG. 22 is a sequence chart showing a communication processing example between each apparatus included in the communication system 100 according to the first embodiment of the present technology.

In FIG. 22, communication processing in a case when the third wireless communication apparatus 410 is deleted from the "group AB" by operating the first wireless communication apparatus 300 is taken as an example. That is, in FIG. 22, a sequence chart corresponding to (B) described above is shown.

First, the display screen to delete the desired wireless communication apparatus from the "group AB" is displayed in the display unit 370 of the first wireless communication apparatus 300.

It is assumed here that the enter button 506 is pressed after a selection operation of the third wireless communication apparatus 410 in the selection area of device to be deleted 551 of the display screen 550 shown in FIG. 17A (701). If a wireless communication apparatus holding no valid MCIM is selected, the display screen 555 shown in FIG. 17B is not displayed.

If the deletion operation from the group AB is received as described above (701), a group deletion request corresponding to the deletion operation is transmitted from the first wireless communication apparatus 300 to the SHO 150 (702, 703).

Subsequently, when the group deletion request is received (703), the SHO 150 identifies the device (third wireless communication apparatus 410) to be deleted based on deletion target device information included in the group deletion request. Thus, the SHO 150 transmits a group deletion request thereof to the RO 200 (704, 705).

After the RO 200 receives the group deletion request (705), the control unit 210 rewrites content of the group management database 220 (706). That is, content of the group management database 220 is rewritten so that the third wireless communication apparatus 410 is deleted (706).

After the group management database 220 is rewritten (706), a group deletion notification is transmitted from the RO 200 to the third wireless communication apparatus 410 (707, 708).

When the group deletion notification is received (708), the control unit 330 of the third wireless communication apparatus 410 causes the display unit 370 to display the group deletion notification (709). A display example thereof is shown in FIG. 18.

[Communication Example (C) Between Each Apparatus]

FIG. 23 is a sequence chart showing a communication processing example between each apparatus included in the communication system 100 according to the first embodiment of the present technology.

In FIG. 23, communication processing in a case when the third wireless communication apparatus 410 is deleted from the "group AB" by operating the third wireless communication apparatus 410 is taken as an example. That is, in FIG. 23, a sequence chart corresponding to (C) described above is shown.

First, the display screen to delete the desired wireless communication apparatus from the "group AB" is displayed in the display unit 370 of the third wireless communication apparatus 410.

It is assumed here that the enter button 506 is pressed after a selection operation of the third wireless communication apparatus 410 in the selection area of device to be deleted 551 of the display screen 550 shown in FIG. 17A (711). If a wireless communication apparatus holding no valid MCIM is selected, the display screen 555 shown in FIG. 17B is not displayed.

If the deletion operation from the group AB is received as described above (711), a group deletion request corresponding to the deletion operation is transmitted from the third wireless communication apparatus 410 to the RO 200 (712, 713). Because, as described above, the third wireless communication apparatus 410 is in the connected state (603) with the RO 200, the group deletion request is directly transmitted from the third wireless communication apparatus 410 to the RO 200.

Subsequently, after the RO 200 receives the group deletion request (713), the control unit 210 rewrites content of the group management database 220 (714). That is, content of the group management database 220 is rewritten so that the third wireless communication apparatus 410 is deleted (714).

After the group management database 220 is rewritten (714), a group deletion notification is transmitted from the RO 200 to the third wireless communication apparatus 410 (715, 716).

When the group deletion notification is received (716), the control unit 330 of the third wireless communication apparatus 410 causes the display unit 370 to display the group deletion notification (717). A display example thereof is shown in FIG. 18.

[Communication Example (D-1) Between Each Apparatus]

FIG. 24 is a sequence chart showing a communication processing example between each apparatus included the communication system 100 according to the first embodiment of the present technology.

In FIG. 24, communication processing in a case when the second wireless communication apparatus 400 is deleted from the "group AB" by operating the third wireless communication apparatus 410 is taken as an example. That is, in FIG. 24, a sequence chart corresponding to (D-1) described above is shown.

First, the display screen to delete the desired wireless communication apparatus from the "group AB" is displayed in the display unit 370 of the third wireless communication apparatus 410.

It is assumed here that the enter button 506 is pressed after a selection operation of the second wireless communication apparatus 400 in the selection area of device to be deleted 551 of the display screen 550 shown in FIG. 17A (721). If a wireless communication apparatus holding no valid MCIM is selected, the display screen 555 shown in FIG. 17B is not displayed.

If the deletion operation from the group AB is received as described above (721), a group deletion request corresponding to the deletion operation is transmitted from the third wireless communication apparatus 410 to the RO 200 (722, 723). Because, as described above, the third wireless communication apparatus 410 is in the connected state (603) with the RO 200, the group deletion request is directly transmitted from the third wireless communication apparatus 410 to the RO 200.

Subsequently, after the RO 200 receives the group deletion request (723), the control unit 210 rewrites content of the group management database 220 (724). That is, content of the group management database 220 is rewritten so that the second wireless communication apparatus 400 is deleted (724).

After the group management database 220 is rewritten (724), a group deletion notification is transmitted from the RO 200 to the second wireless communication apparatus 400 (725, 726).

When the group deletion notification is received (726), the control unit 330 of the second wireless communication apparatus 400 causes the display unit 370 to display the group deletion notification (727). A display example thereof is shown in FIG. 18.

[Communication Example (D-2) Between Each Apparatus]

FIGS. 25 and 26 are a sequence chart showing a communication processing example between each apparatus included in the communication system 100 according to the first embodiment of the present technology.

In FIGS. 25 and 26, communication processing in a case when the first wireless communication apparatus 300 is deleted from the "group AB" by operating the third wireless communication apparatus 410 is taken as an example. That is, in FIGS. 25 and 26, a sequence chart corresponding to (D-2) described above is shown.

First, the display screen to delete the desired wireless communication apparatus from the "group AB" is displayed in the display unit 370 of the third wireless communication apparatus 410.

If the enter button 506 is pressed after a selection operation of the first wireless communication apparatus 300 in the selection area of device to be deleted 551 of the display screen 550 shown in FIG. 17A, the display screen 555 shown in FIG. 17B is displayed. Subsequently, it is assumed that the enter button 506 is pressed after a selection operation of "Pass MCIM to another device remaining in group" in the MCIM handling selection area 556 of the display screen 555 (731).

If the deletion operation from the group AB is received as described above (731), a group deletion request corresponding to the deletion operation is transmitted from the third wireless communication apparatus 410 to the SHO 150 via the RO 200 (732 to 735). Because, as described above, the third wireless communication apparatus 410 is in the connected state (603) with the RO 200, the group deletion request is transmitted to the SHO 150 via the RO 200.

Subsequently, when the group deletion request is received (735), the SHO 150 determines handling of MCIM of the first wireless communication apparatus 300 based on valid MCIM holding device information included in the group deletion request. In the example shown in FIGS. 25 and 26, like in FIGS. 19 and 20, "Pass MCIM to another device remaining in group" is selected in the MCIM handling selection area 556 of the display screen 555. Thus, processing to disable MCIM in the first wireless communication apparatus 300 is performed (736 to 743). The disable processing is substantially the same as the disable processing (654 to 661) shown in FIGS. 19 and 20 and thus, the description here is omitted.

Subsequently, MCIM enable processing to enable MCIM of the third wireless communication apparatus 410 is performed (744 to 761). The enable processing is substantially the same as the enable processing (662 to 679) shown in FIGS. 19 and 20 except that the target of the enable processing is different and thus, the description here is omitted.

Subsequently, a group deletion completion notification indicating that deletion processing in accordance with the group deletion request is completed is transmitted from the RO 200 to the first wireless communication apparatus 300 (762, 763). Because MCIM in the first wireless communication apparatus 300 is disabled, the group deletion completion notification is directly transmitted from the RO 200 to the first wireless communication apparatus 300 (762, 763).

When the group deletion completion notification is received (763), the control unit 330 of the first wireless communication apparatus 300 causes the display unit 370 to display the group deletion completion notification (764). A display example thereof is shown in FIG. 18.

Therefore, according to an embodiment of the present technology, for example, contract authentication information (MCIM) of the public network 110 can easily be shared among a plurality of devices in a group. In this case, when a new device is added and registered with the group, the new device can reliably be added while maintaining safety. That is, safety can further be promoted and the addition can be ensured by, in addition to authentication using the ID and password of a group, the confirmation (addition approval) by another device belonging to the group. Accordingly, even if, for example, the ID or password of a group is lost or the ID or password is leaked, unintended addition to a group by a third party can be prevented. That is, according to an embodiment of the present technology, rights to connect to a network can easily be shared among a plurality of wireless communication apparatuses and safety of the sharing can be maintained.

The embodiment of the present technology has been described by taking the information processing apparatus (RO) 200 integrally configured as an example. The embodiment of the present technology can also be applied to an information processing system in which each unit (for example, the control unit 210 and the group management database 220) included in such an information processing apparatus includes a plurality of apparatuses. In addition, the embodiment of the present technology has been described by taking the group AB including two or three wireless communication apparatuses as an example, but the embodiment of the present technology can also be applied to a group including four or more wireless communication apparatuses. Further, an embodiment of the present technology can be applied to a mobile wireless communication apparatus (for example, a terminal apparatus dedicated to data communication) or a fixed wireless communication apparatus (for example, a wireless communication apparatus for the purpose of collecting data of a vending machine).

In addition, the embodiment of the present technology has been described by taking, as network connection rights, rights of using MCIM as an example. However, an embodiment of the present technology can also be applied to other network connection rights to connect to a predetermined network based on other information (for example, USIM (Universal Subscriber Identity Module)).

Also, the above-described embodiments are intended only to show examples realizing the present technology, and matters according to the embodiments and specific inventive matters within the scope of claims have a correspondence relation. Likewise, specific inventive matters within the scope of claims, and matters according to the embodiments of the present technology, to which the same names as the specific inventive matters are assigned, have a correspondence relation. However, the present technology is not limited to the embodiments, and the embodiments may also be modified in various forms without departing from the scope and spirit of the present technology.

Also, the processing procedures described in the above-mentioned embodiments may be methods including a series of these steps, and may also include a program for executing a series of these steps on a computer or a recording medium storing the program. As the recording medium, for example, a Compact Disc (CD), Minidisc (MD), a Digital Versatile Disc (DVD), a memory card, a Blu-ray Disc (trademark), or the like may be used.

Additionally, the present technology may also be configured as below.

(1)

A wireless communication apparatus including:

a reception unit that receives group information to identify a group as an operation input for additional registration with the group including a plurality of wireless communication apparatuses sharing a network connection right to connect to a predetermined network via a wireless line; and a control unit that, when the group information is received, transmits an addition request that requests the additional registration with the group to a management system that manages the group via a wireless line on condition that an approval operation has been performed by one of the wireless communication apparatuses included in the group.

(2)

The wireless communication apparatus according to (1), wherein, when the addition request is received, the management system additionally registers the wireless communication apparatus having transmitted the addition request with the group on condition that the approval operation has been performed.

(3)

The wireless communication apparatus according to (1) or (2), wherein the reception unit receives wireless communication apparatus information to identify the wireless communication apparatus that performs the approval operation, wherein the control unit includes the wireless communication apparatus information in the addition request, and transmits the included wireless communication apparatus information, and wherein, when the addition request is received, the management system additionally registers the wireless communication apparatus having transmitted the addition request with the group on condition that the approval operation has been performed by the wireless communication apparatus related to the wireless communication apparatus information included in the addition request.

(4)

The wireless communication apparatus according to any one of (1) to (3), wherein the reception unit receives approval method information to identify an approval method when performing the approval operation, wherein the control unit includes the approval method information in the addition request, and transmits the included approval method information, and wherein, when the addition request is received, the management system additionally registers the wireless communication apparatus having transmitted the addition request with the group on condition that the approval operation has been performed by the approval method related to the approval method information included in the addition request.

(5)

The wireless communication apparatus according to (4), wherein the reception unit receives the approval method information that identifies one of the approval method of approving the addition request by a selection operation, the approval method of approving the addition request by an input operation of identification information, and the approval method of approving the addition request by an operation of an operation member.

(6)

The wireless communication apparatus according to any one of (1) to (5), wherein, if the wireless communication apparatus that performs the approval operation holds the network connection right, the management system transmits an addition approval request that requests that the approval operation is performed to the wireless communication apparatus through a connection based on the network connection right.

(7)

The wireless communication apparatus according to any one of (1) to (6), wherein, when a notification indicating and the additional registration with the group in accordance with the addition request is received from the management system, the control unit causes a display unit to display the additional registration with the group.

(8)

The wireless communication apparatus according to any one of (1) to (7), wherein the reception unit receives an operation input to delete one of the wireless communication apparatuses included in the group from the group, wherein, when the operation input to delete the one of the wireless communication apparatuses is received, the control unit transmits a deletion request to delete the one of the wireless communication apparatuses to be deleted from the group to the management system, and wherein the management system performs deletion processing on the one of the wireless communication apparatuses to be deleted from the group.

(9)

The wireless communication apparatus according to any one of (1) to (8), wherein the reception unit receives identification information and a password attached to the group as the group information.

(10)

The wireless communication apparatus according to any one of (1) to (9), wherein the network connection right is a right to connect to a base station based on contract authentication information to connect to the base station operated by a communication operator.

(11)

The wireless communication apparatus according to any one of (1) to (10), wherein the management system is an RO (Registration Operator).

(12)

The wireless communication apparatus according to any one of (1) to (11), wherein, among the plurality of wireless communication apparatuses included in the group, a wireless communication apparatus holding the network connection right is connectable to an SHO (Selected Home Operator) on the basis of the network connection right, and wherein, among the plurality of wireless communication apparatuses included the group, a wireless communication apparatus other than the wireless communication apparatus holding the network connection right is connectable only to an RO (Registration Operator).

(13)

A communication system including:

a wireless communication apparatus including a control unit that, when group information to identify a group as an operation input for additional registration with the group including a plurality of wireless communication apparatuses sharing a network connection right to connect to a predetermined network via a wireless line is received, transmits an addition request that requests and the additional registration with the group to an information processing apparatus that manages the group via a wireless line on condition that an approval operation has been performed by one of the wireless communication apparatuses included in the group; and an information processing apparatus including a control unit that, when the addition request is received from another wireless communication apparatus other than the plurality of wireless communication apparatuses included in the group, transmits an addition approval request that causes one of the wireless communication apparatuses included in the group to perform an approval operation on the addition request via a wireless line and additionally registers the wireless communication apparatus having transmitted the addition request with the group on condition that an addition approval result indicating that the approval operation has been performed on the addition request is received from the wireless communication apparatus to which the addition approval request has been transmitted.

(14)

A control method of a wireless communication apparatus, including:

a reception procedure of receiving group information to identify a group as an operation input for additional registration with the group including a plurality of wireless communication apparatuses sharing a network connection right to connect to a predetermined network via a wireless line; and a transmission procedure of transmitting an addition request that requests the additional registration with the group to a management system that manages the group via a wireless line on condition that an approval operation has been performed by one of the wireless communication apparatuses included in the group.

(15)

An information processing apparatus comprising:

a first controller that, when an addition request to add and register with a group including a plurality of wireless communication apparatuses sharing network connection rights to connect to a predetermined network via a wireless line is received from a wireless communication apparatus other than the plurality of wireless communication apparatuses, transmits an addition approval request to cause one of the wireless communication apparatuses included in the group to perform an approval operation to the addition request via the wireless line; and a second controller that adds and registers the wireless communication apparatus having transmitted the addition request with the group on condition that an addition approval result indicating that the approval operation to the addition request has been perform is received from the wireless communication apparatus to which the addition approval request has been transmitted.

(16)

The information processing apparatus according to (15), wherein information about the group includes identification information and a password attached to the group, further comprising:

a storage unit that associates and stores the identification information and the password, and each of the wireless communication apparatuses included in the group for each of the groups, wherein the first controller that, when the addition request is received, extracts the group whose identification information and password match the identification information and the password included in the addition request and transmits the addition approval request when the matching group is extracted.

(17)

The information processing apparatus according to (16), wherein the addition request includes wireless communication apparatus information about the wireless communication apparatus caused to perform the approval operation and when the addition request is received, the first controller determines whether the wireless communication apparatus related to the wireless communication apparatus information included in the addition request belongs to the extracted group and, if the wireless communication apparatus belongs to the extracted group, transmits the addition approval request to the wireless communication apparatus.

(18)

The information processing apparatus according to (17), wherein when the wireless communication apparatus information is not included in the addition request, the first controller transmits the addition approval request to one of the wireless communication apparatuses included in the extracted group.

REFERENCE SIGNS LIST

100 communication system
110 public network
120 network control apparatus
121, 122 base station
123 to 126 wireless line
200 information processing apparatus (RO)
210 control unit
220 group management database
300 first wireless communication apparatus
311 antenna
312 antenna shared unit
321 modulation unit
322 demodulation unit
330 control unit
331 bus
340 memory
350 MCIM information storage unit
360 operation unit
370 display unit
380 position information acquisition unit
391 microphone
392 speaker
400 second wireless communication apparatus
410 third wireless communication apparatus
525 speaker
526 light-emitting unit
527 operation unit

The invention claimed is:

1. A wireless communication apparatus comprising:

a reception unit that receives group information to identify a group as an operation input for additional registration with the group including a plurality of wireless communication apparatuses sharing a network connection right to connect to a predetermined network via a wireless line; and a control unit that, when the group information is received, transmits an addition request that requests the additional registration with the group to a management system that manages the group via a wireless line on condition that an approval operation has been performed by one of the wireless communication apparatuses included in the group;

wherein the reception unit receives approval method information to identify an approval method when performing the approval operation, wherein the control unit includes the approval method information in the addition request, and transmits the included approval method information, and wherein, when the addition request is received, the management system additionally registers the wireless communication apparatus having transmitted the addition request with the group on condition that the approval operation has been performed by the approval method related to the approval method information included in the addition request.

2. The wireless communication apparatus according to claim 1, wherein the reception unit receives wireless communication apparatus information to identify the wireless communication apparatus that performs the approval operation, wherein the control unit includes the wireless communication apparatus information in the addition request, and transmits the included wireless communication apparatus information, and wherein, when the addition request is received, the management system additionally registers the wireless communication apparatus having transmitted the addition request with the group on condition that the approval operation has been performed by the wireless communication apparatus related to the wireless communication apparatus information included in the addition request.

3. The wireless communication apparatus according to claim 1, wherein the reception unit receives the approval method information that identifies one of the approval method of approving the addition request by a selection operation, the approval method of approving the addition request by an input operation of identification information, and the approval method of approving the addition request by an operation of an operation member.

4. The wireless communication apparatus according to claim 1, wherein, if the wireless communication apparatus that performs the approval operation holds the network connection right, the management system transmits an addition approval request that requests that the approval operation is performed to the wireless communication apparatus through a connection based on the network connection right.

5. The wireless communication apparatus according to claim 1, wherein, when a notification indicating and the additional registration with the group in accordance with the addition request is received from the management system, the control unit causes a display unit to display the additional registration with the group.

6. The wireless communication apparatus according to claim 5,
wherein the reception unit receives an operation input to delete one of the wireless communication apparatuses included in the group from the group,
wherein, when the operation input to delete the one of the wireless communication apparatuses is received, the control unit transmits a deletion request to delete the one of the wireless communication apparatuses to be deleted from the group to the management system, and
wherein the management system performs deletion processing on the one of the wireless communication apparatuses to be deleted from the group.

7. The wireless communication apparatus according to claim 1, wherein the reception unit receives identification information and a password attached to the group as the group information.

8. The wireless communication apparatus according to claim 1, wherein the network connection right is a right to connect to a base station based on contract authentication information to connect to the base station operated by a communication operator.

9. The wireless communication apparatus according to claim 1, wherein the management system is an RO (Registration Operator).

10. The wireless communication apparatus according to claim 1,
wherein, among the plurality of wireless communication apparatuses included in the group, a wireless communication apparatus holding the network connection right is connectable to an SHO (Selected Home Operator) on the basis of the network connection right, and
wherein, among the plurality of wireless communication apparatuses included the group, a wireless communication apparatus other than the wireless communication apparatus holding the network connection right is connectable only to an RO (Registration Operator).

11. A communication system comprising:
a wireless communication apparatus including a control unit that, when group information to identify a group as an operation input for additional registration with the group including a plurality of wireless communication apparatuses sharing a network connection right to connect to a predetermined network via a wireless line is received, transmits an addition request that requests and the additional registration with the group to an information processing apparatus that manages the group via a wireless line on condition that an approval operation has been performed by one of the wireless communication apparatuses included in the group, wherein the control unit of the wireless communication apparatus receives approval method information to identify an approval method when performing the approval operation, includes the approval method information in the addition request, and transmits the included approval method information; and
an information processing apparatus including a control unit that, when the addition request is received from another wireless communication apparatus other than the plurality of wireless communication apparatuses included in the group, transmits an addition approval request that causes one of the wireless communication apparatuses included in the group to perform an approval operation on the addition request via a wireless line and additionally registers the wireless communication apparatus having transmitted the addition request with the group on condition that an addition approval result indicating that the approval operation has been performed on the addition request is received from the wireless communication apparatus to which the addition approval request has been transmitted, wherein, when the addition request is received, the control unit of the information processing apparatus additionally registers the wireless communication apparatus having transmitted the addition request with the group on condition that the approval operation has been performed by the approval method related to the approval method information included in the addition request.

12. A control method of a wireless communication apparatus, comprising:
a reception procedure of receiving group information to identify a group as an operation input for additional registration with the group including a plurality of wireless communication apparatuses sharing a network connection right to connect to a predetermined network via a wireless line, wherein the reception procedure comprises receiving approval method information to identify an approval method when performing the approval operation;
a transmission procedure of transmitting an addition request that requests the additional registration with the group to a management system that manages the group via a wireless line on condition that an approval operation has been performed by one of the wireless communication apparatuses included in the group, wherein the transmission procedure comprises including the approval method information in the addition request, and transmitting the included approval method information; and
a registration procedure of, when the addition request is received, additionally registering the wireless communication apparatus having transmitted the addition request with the group on condition that the approval operation has been performed by the approval method related to the approval method information included in the addition request.

* * * * *